(12) United States Patent
Aihara et al.

(10) Patent No.: US 10,716,340 B2
(45) Date of Patent: Jul. 21, 2020

(54) SYSTEM AND DEVICE FOR AFFECTING DRAG PROPERTIES OF AN OBJECT

(71) Applicant: NIKE, Inc., Beaverton, OR (US)

(72) Inventors: Yuki Aihara, Portland, OR (US); Leonard W. Brownlie, Portland, OR (US); Jorge E. Carbo, Jr., Aloha, OR (US); Edward L. Harber, Beaverton, OR (US); Ryan P. Henry, Beaverton, OR (US); Irena Ilcheva, Portland, OR (US); Susan L. Sokolowski, Portland, OR (US)

(73) Assignee: NIKE, INC., Beaverton, OR (US)

( * ) Notice: Subject to any disclaimer, the term of this patent is extended or adjusted under 35 U.S.C. 154(b) by 822 days.

(21) Appl. No.: 15/160,795

(22) Filed: May 20, 2016

(65) Prior Publication Data
US 2016/0345641 A1 Dec. 1, 2016

Related U.S. Application Data

(60) Provisional application No. 62/167,062, filed on May 27, 2015.

(51) Int. Cl.
*A41D 13/00* (2006.01)
*B64C 23/06* (2006.01)

(52) U.S. Cl.
CPC .......... *A41D 13/0015* (2013.01); *B64C 23/06* (2013.01); *A41D 2400/24* (2013.01)

(58) Field of Classification Search
CPC ...... A41D 13/0015; A41D 1/08; A41D 27/10; A41D 2400/24; A41B 1/08; B64C 23/06; Y10T 428/14
See application file for complete search history.

(56) References Cited

U.S. PATENT DOCUMENTS

| | | | | |
|---|---|---|---|---|
| 4,986,496 A | * | 1/1991 | Marentic | B05D 5/02 244/130 |
| 5,058,837 A | * | 10/1991 | Wheeler | B64C 23/06 244/198 |
| 5,887,280 A | | 3/1999 | Waring | |

(Continued)

FOREIGN PATENT DOCUMENTS

| CN | 101898033 A | 12/2010 |
|---|---|---|
| TW | M475302 U | 4/2014 |

(Continued)

OTHER PUBLICATIONS

International Preliminary Report on Patentability dated Dec. 7, 2017 in International Patent Application No. PCT/US2016/034075, 15 pages.
International Search Report and Written Opinion dated Oct. 11, 2016 in International Application No. PCT/US2016/034075, 22 pages.

(Continued)

*Primary Examiner* — Patricia L. Nordmeyer
(74) *Attorney, Agent, or Firm* — Shook, Hardy and Bacon

(57) ABSTRACT

A vortex generator might be attached to various types of articles to reduce the drag. For example, vortex generators might be attached to a garment or to adhesive tape. In addition, vortex generators might be attached to various types of athletic equipment. A mapping can suggest placement of a vortex-generator arrangement on an article, as well as prescribe particular vortex-generator arrangements for regions of a person.

11 Claims, 23 Drawing Sheets

(56) References Cited

U.S. PATENT DOCUMENTS

| | | | |
|---|---|---|---|
| 8,668,166 B2* | 3/2014 | Rawlings | B32B 3/30 244/130 |
| 9,868,516 B2* | 1/2018 | Rosenberger | B64C 23/06 |
| 2004/0118579 A1* | 6/2004 | McCutcheon | F28D 15/0241 174/16.3 |
| 2004/0131815 A1* | 7/2004 | Maggio | A47G 1/17 428/40.1 |
| 2012/0131720 A1 | 5/2012 | Nordstrom et al. | |

FOREIGN PATENT DOCUMENTS

| | | | |
|---|---|---|---|
| WO | 9011929 | A1 | 10/1990 |
| WO | 0015961 | A1 | 3/2000 |
| WO | 0045656 | A2 | 8/2000 |
| WO | 2010151684 | A2 | 12/2010 |

OTHER PUBLICATIONS

Wen, Li et al.: "Biomimetic shark skin: design, fabrication and hydrodynamic function". Journal of Experimental Biology, vol. 217, No. 10, May 14, 2014, pp. 1656-1666.

Oefiner, J. et al., "The hydrodynamic function of shark skin and two biomimetic applications". Journal of Experimental Biology, vol. 215, No. 5, Feb. 8, 2012, pp. 785-795.

Wen, Li, et al.: "Hydrodynamic function of biomimetic shark skin: effect of denticle pattern and spacing". Bioinspiration & Biomimetics, Institute of Physics Publishing, vol. 10, No. 6, Nov. 18, 2015, p. 66010.

Communication pursuant to Rule 164(2)(b) and Article 94(3) dated Apr. 16, 2019 in European Patent Application No. 16734067.8, 7 pages.

Communication pursuant to Article 94(3) dated Nov. 7, 2019 in European Patent Application No. 16734067.8, 5 pages.

* cited by examiner

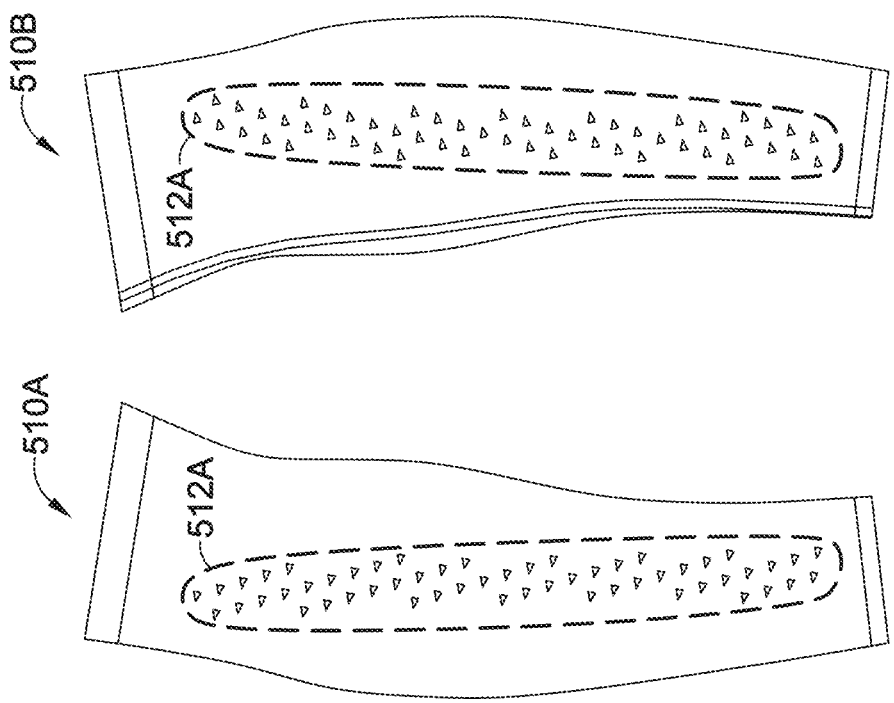
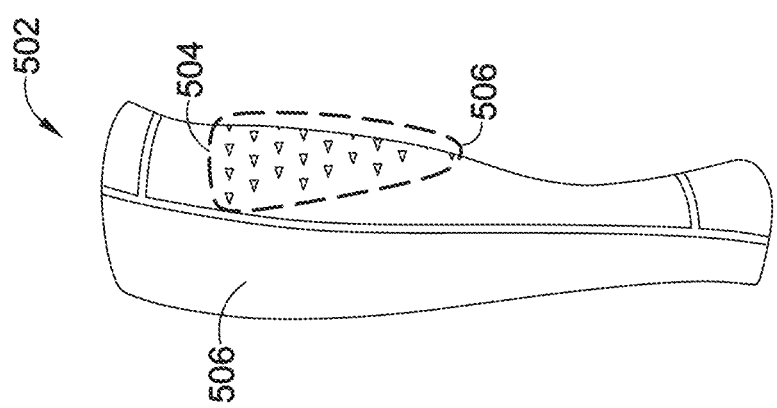

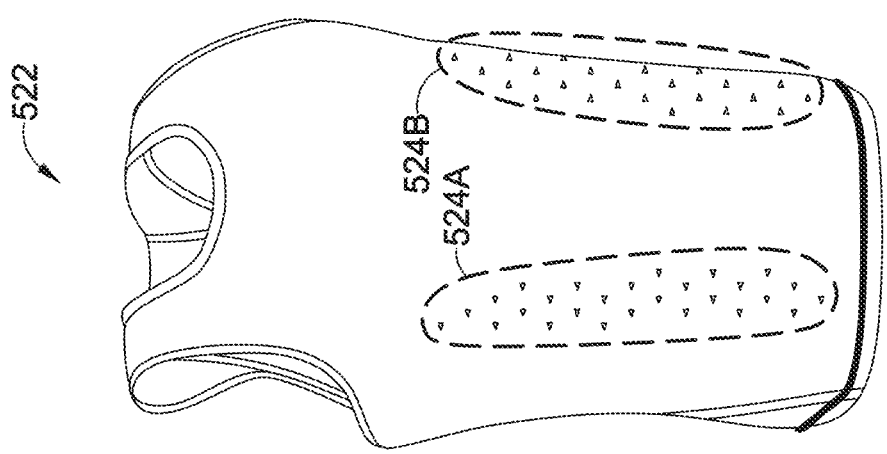

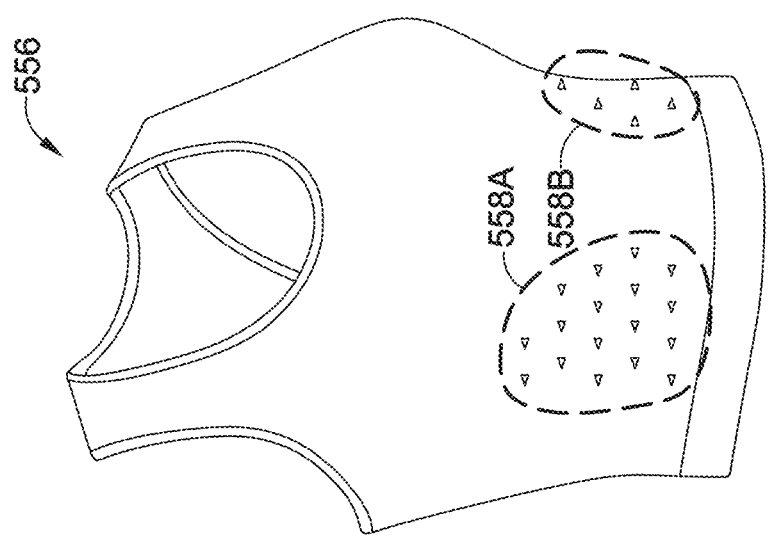

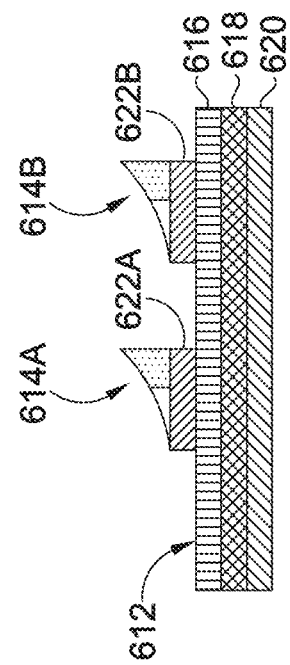
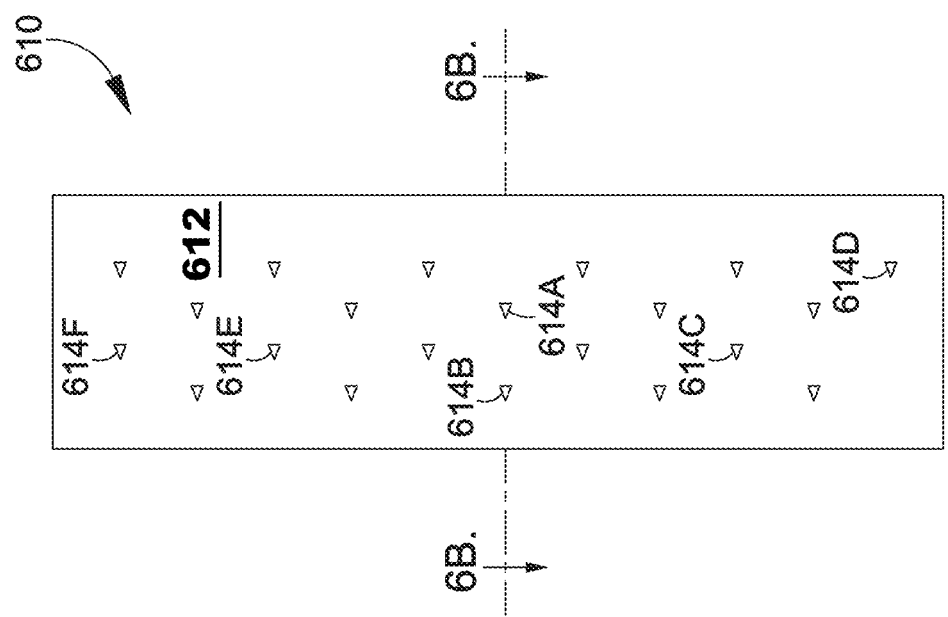
FIG. 6B
FIG. 6A

SYSTEM AND DEVICE FOR AFFECTING DRAG PROPERTIES OF AN OBJECT

CROSS REFERENCE TO RELATED APPLICATION(S)

This application claims the benefit of U.S. Provisional Patent Application No. 62/167,062 (filed on May 27, 2015), which is incorporated herein by reference in the entirety.

TECHNICAL FIELD

This application is related to affecting drag properties of an object that experiences motion.

BRIEF SUMMARY

In brief, and at a high level, this disclosure describes, among other things, a system of vortex generators that is applied to an object. In addition, this disclosure describes articles that are constructed to include vortex generators, including garment articles, tape, athletic equipment, and the like. Further, this disclosure describes a vortex-generator structure, as well as methods of making vortex generators and coupling them to an article. This high-level overview is provided to introduce a selection of concepts that are further described below in the detailed-description section. This summary is not intended to identify key features or essential features of the claimed subject matter, nor is it intended to be used as an aid in isolation to determine the scope of the claimed subject matter.

BRIEF DESCRIPTION OF THE DRAWINGS

The present invention is described in detail herein with reference to the attached figures, which are incorporated herein by reference, wherein:

FIGS. 5A-5K depict various garments including vortex generators in accordance with an aspect hereof;

FIG. 6A depicts a vortex-generator-enhanced tape in accordance with an aspect hereof;

FIG. 6B depicts a schematic, cross-sectional view of the vortex-generator-enhanced tape of FIG. 6A in accordance with an aspect hereof;

DETAILED DESCRIPTION

Figure 1:
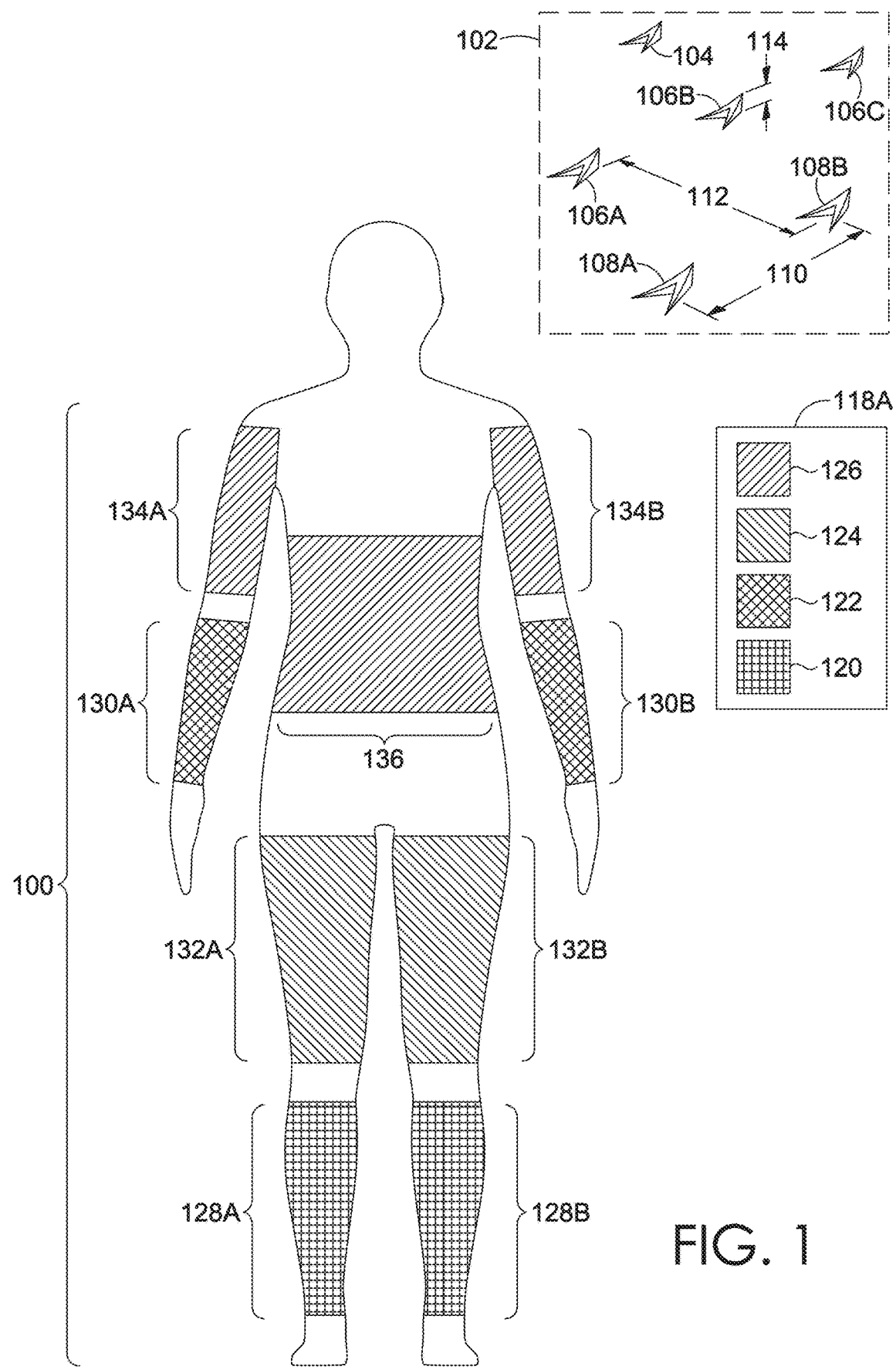
FIG. 1 depicts a first mapping of various vortex-generator patterns in accordance with an aspect hereof.

The subject matter of aspects of the present invention is described with specificity herein to meet statutory requirements. But the description itself is not intended to necessarily limit the scope of claims. Rather, the claimed subject matter might be embodied or carried out in other ways to include different elements or combinations of elements similar to the ones described in this document, in conjunction with other present or future technologies.

Overview

Vortex generators are sometimes attached to a surface of an object in order to improve aerodynamic qualities and reduce drag. Often vortex generators are used in automotive or aircraft technologies. But other types of structures that experience movement can also benefit from improved aerodynamic qualities, such as articles associated with human movement and athletic equipment. experience Various sporting or athletic events can be decided based on fractions of a second or an inch. For example, in the 100 m sprint, track-and-field event, mere hundredths of a second often separate one runner from another runner. Thus, the amount of drag that one athlete experiences, as compared with an opposing athlete, can have an affect the outcome of an event. At a high level, this technology is related to reducing drag of an object that is subject to a motion by positioning one or more vortex generators on the object.

In one aspect, the technology includes a system of vortex generators (VG) that are positioned at various locations on an athlete's body. For example, the system might include one area or zone (e.g., distal portion of appendage) having a first arrangement of vortex generators and another area or zone (e.g., torso) having a second arrangement of vortex generators. Each of the respective arrangements includes respective arrangement properties that are selected for at least some of the benefits of a vortex generator, while taking into account other factors that can affect athletic, equipment, and/or apparel performance (e.g., weight, breathability, moisture management, and the like). Exemplary arrangement properties can include a vortex-generator height, a vortex-generator density, a size of the vortex-generator arrangement, and a shape of the vortex-generator arrangement.

In a further aspect, various apparatuses or devices might be used as a vehicle or medium to apply a system of vortex generators to an athlete's body. For instance, vortex generators might be arranged on a garment (e.g., shirt-type garment, pant-type garment, arm sleeve, leg sleeve, footwear, headwear, handwear, and the like) that is worn by the athlete. A garment can be constructed to include a particular arrangement of vortex generators that includes arrangement properties selected for a particular zone (e.g., torso or forearm). As such, a set of garments (e.g., shirt, shorts, and sleeves) can be utilized to provide different vortex-generator arrangements to different zones on an athlete. In addition, garments can be combined into a single garment (e.g., unitard) having different vortex-generator arrangements on different areas of the garment. In another aspect, vortex generators might be arranged on an adhesive body, such as tape, which can then be selectively applied to various zones on an athlete's body. Similarly to a garment, a tape can be constructed to include a particular arrangement of vortex generators that includes arrangement properties selected for a particular zone (e.g., lateral shin zone), and the tape can be selectively applied based on the arrangement. Tape that is constructed to include vortex generators may be applied to a garment or directly to a person's body.

Various types of vortex generators might be utilized in these systems. In one aspect, the vortex generator includes a vane having a dart-shaped configuration. In addition, the vane includes a surface that engages a boundary layer and that includes a simple-curved surface or a complex-curved surface.

One aspect of the present disclosure is directed to a system for reducing drag on an object. The system includes a first vortex-generator arrangement coupled to a first article and a second vortex-generator arrangement coupled to a second article. The first vortex-generator arrangement includes a first set of vortex generators having a first substantially consistent spacing and a first substantially consistent vortex-generator height. The second vortex-generator arrangement includes a second set of vortex generators having a second substantially consistent spacing and a second substantially consistent vortex-generator height. The second substantially consistent spacing is different than the first substantially consistent spacing and/or the second vortex-generator height is different than the first vortex-generator height.

Another aspect of the disclosure is directed to a vortex-generator kit. The vortex-generator kit includes a first article having a first vortex-generator arrangement and a second article comprising a second vortex-generator arrangement. The first vortex-generator arrangement includes a first set of vortex generators having a first substantially consistent spacing and a first substantially consistent vortex-generator height. The second vortex-generator arrangement includes a second set of vortex generators having a second substantially consistent spacing and a second substantially consistent vortex-generator height. The first and second substantially consistent spacing and the first and second substantially consistent vortex-generator height are based on a vortex-generator mapping.

A further aspect of the present disclosure includes a vortex generator having a base and a vane. The vane includes a bottom portion that has a dart-polygon configuration and that is integrally formed with the base. The vane also includes a top surface that is generally concave. The dart-polygon configuration includes a first convex portion, a second convex portion, a third convex portion, and a concave portion. In addition, an angle of the first convex portion is greater than respective angles of the second convex portion and the third convex portion, which are substantially similar.

In addition, the disclosure describes another vortex generator having a vane. The vane includes a bottom portion having a dart-polygon configuration defined by at least four edges. The edges include a first edge and a second edge that intersect at a first vertex to form a convex interior angle, and a third edge and a fourth edge that intersect at a second vertex to form a concave interior angle, wherein the first edge and the third edge intersect at a third vertex and the second edge and the fourth edge intersect at a fourth vertex. In addition, the vane includes a set of walls that extend from the at least four edges and that comprise a first wall and a second wall that extend from the first edge and the second edge, respectively, and that share a fifth edge, which intersects with the first edge and the second edge at the first vertex. The first wall includes a first curved edge and the second wall includes a second curved edge that intersects with the first curved edge at a fifth vertex, which is joined to the first vertex by the fifth edge. The first curved edge intersects with the third vertex and the second curved edge intersects with the fourth vertex. The vane also includes a third wall and a fourth wall that extend from the third edge and the fourth edge, respectively, and that share a sixth edge, which intersects with the third edge and the fourth edge at the second vertex. The third wall includes a third curved edge and the fourth wall includes a fourth curved edge that intersects with the third curved edge at a sixth vertex, which is joined to the second vertex by the sixth edge. The third curved edge intersects with the third vertex and the fourth curved edge intersects with the fourth vertex. The vane also includes a top surface that is generally concave and that is defined by the first curved edge, the second curved edge, the third curved edge, and the fourth curved edge.

This disclosure also describes a vortex-generator article including an article layer, a base that is coupled to the article layer, and a vane. The vane includes a bottom portion that has a dart-polygon configuration and that is integrally formed with the base. The vane also includes a top surface that is generally concave. The dart-polygon configuration includes a midline that intersects with a convex portion of the dart-polygon configuration and with a concave portion of the dart-polygon configuration.

A further aspect of the present disclosure describes a vortex-generator applique. The vortex-generator applique includes a strip of material having a first side and a second side and an adhesive layer applied to the first side of the strip of material. One or more vortex generators are coupled to the second side of the first strip of material.

In an additional aspect, the present disclosure describes a kit for affecting drag properties of an object. The kit includes a first vortex-generator applique and a second vortex-generator applique. The first vortex-generator applique includes a first strip of material having a first vortex-generator side and a first adhesive side, as well as a first adhesive layer applied to the first adhesive side of the first strip of material. In addition, the first vortex-generator applique includes a first set of one or more vortex generators coupled to the first vortex-generator side of the first strip of material, the first set of one or more vortex generators including a first pattern. The second vortex-generator applique includes a second strip of material having a second vortex-generator side and a second adhesive side, as well as a second adhesive layer applied to the second adhesive side of the second strip of material. In addition, the second vortex-generator applique includes a second set of one or more vortex generators coupled to the second vortex-generator side of the second strip of material, the second set of one or more vortex generators including a second pattern that is different from the first pattern.

Mapping Vortex-Generator Patterns

As indicated previously, one aspect of the present invention includes a system of vortex generators that are arranged at various locations relative to an athlete's body. Referring now to FIGS. 1-4, different mappings are illustrated that depict various possible arrangements of vortex generators on a respective athlete (e.g., female or male) competing in a respective event (e.g., sprint-distance or at least medium-distance running-based event). Generally, each of the mappings depicted in FIGS. 1-4 includes different vortex-generator patterns prescribed to different human anatomical zones of the athlete. As used in this description, the term "pattern" or "vortex-generator pattern" describes a set of vortex-generators having a substantially consistent set of properties, such as spacing between vortex generators and vortex-generator dimensions (e.g., height, width, length, shape, etc.).

In an aspect of the disclosure, a mapping suggests a vortex-generator spacing and sizing that might be recommended for a particular type of athlete competing in a particular type of event. For example, a mapping (e.g., 100, 200, 300, or 400) may suggest patterns recommended for a particular body type or body-movement styles. As such, a mapping that is suggested for a body type may account for body-measurement ratios based on height, body circumference, appendage length, appendage circumference, and the like. In addition, a mapping that is suggested for a body-movement style may account for running style (e.g., more upright as compared with more forward lean), jumping style, appendage speed (e.g., lower-leg velocities, upper leg velocities, lower-arm velocities, upper-arm velocities, etc.), and the like. Although some portions of this disclosure describe that a mapping may be recommended for a female person, the mapping may also be recommended for a male, and vice versa. In addition, although some portions of this disclosure describe that a mapping may be recommended for a person engaging in a type of event, the mapping may be recommended for someone engaging in other types of events.

To further explain the use of patterns in FIG. 1-4, a pattern template is depicted in an enlarged window 102 of FIG. 1 to illustrate that a pattern might include a spacing based on a first distance 110 and a second distance 112. For example, in the window 102 the pattern of vortex generators includes a first row of vortex generators 108A and 108B that are spaced the distance 110 apart from one another. In addition, in window 102 the pattern of vortex generators includes a second row of vortex generators 106A, 106B, and 106C. In an aspect of the present invention, the second row of vortex generators 106A, 106B, and 106C is offset from the first row 108A and 108B and is spaced apart from the first row by the distance 112 that is substantially similar to the distance 110. However, the vortex generators may not be offset. In a further aspect, the pattern depicted in window 102 reflects that the vortex generators include a vortex-generator height 114 consistent among the pattern.

Figure 2:
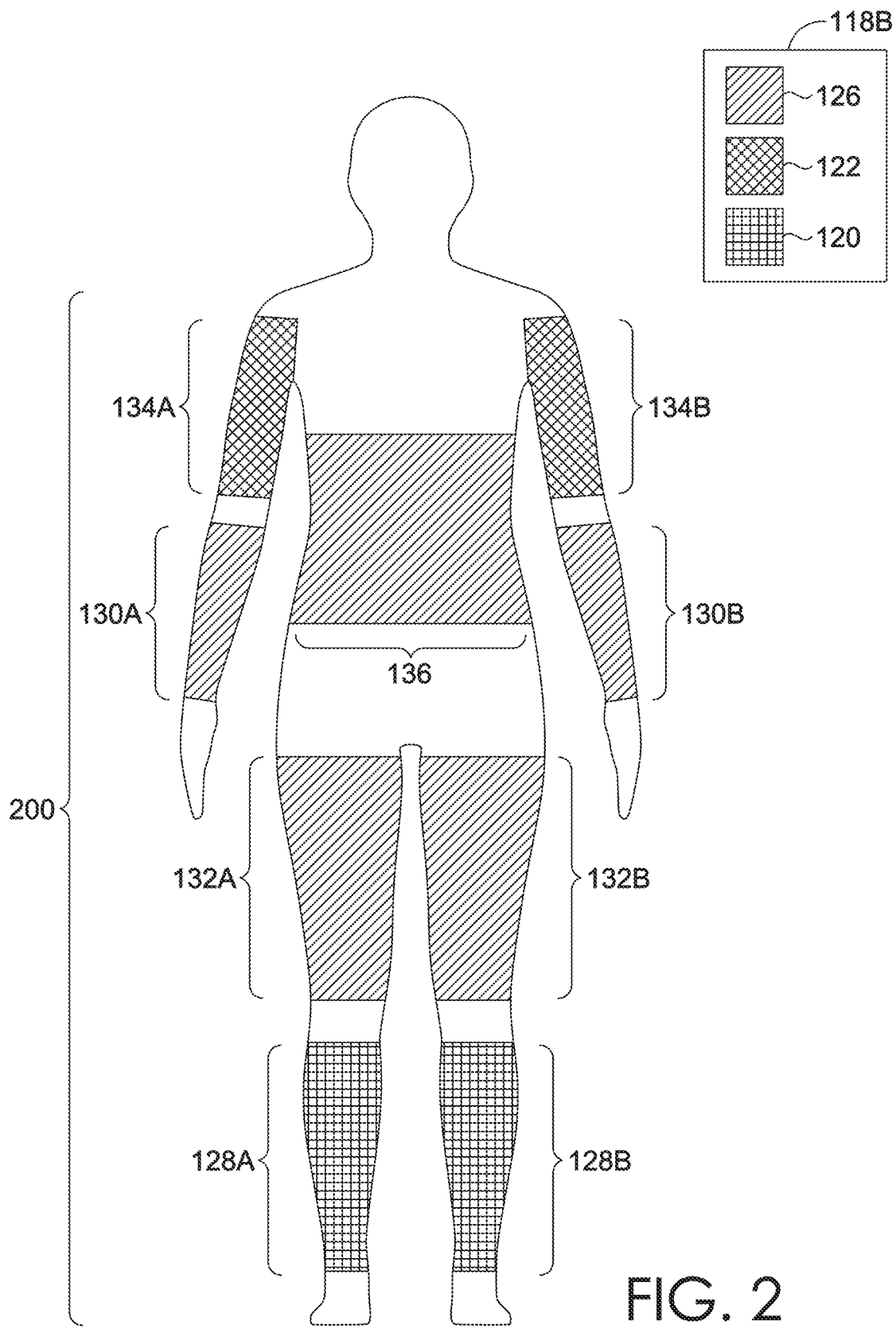
FIG. 2 depicts a second mapping of various vortex-generator patterns in accordance with an aspect hereof.
Figure 3:
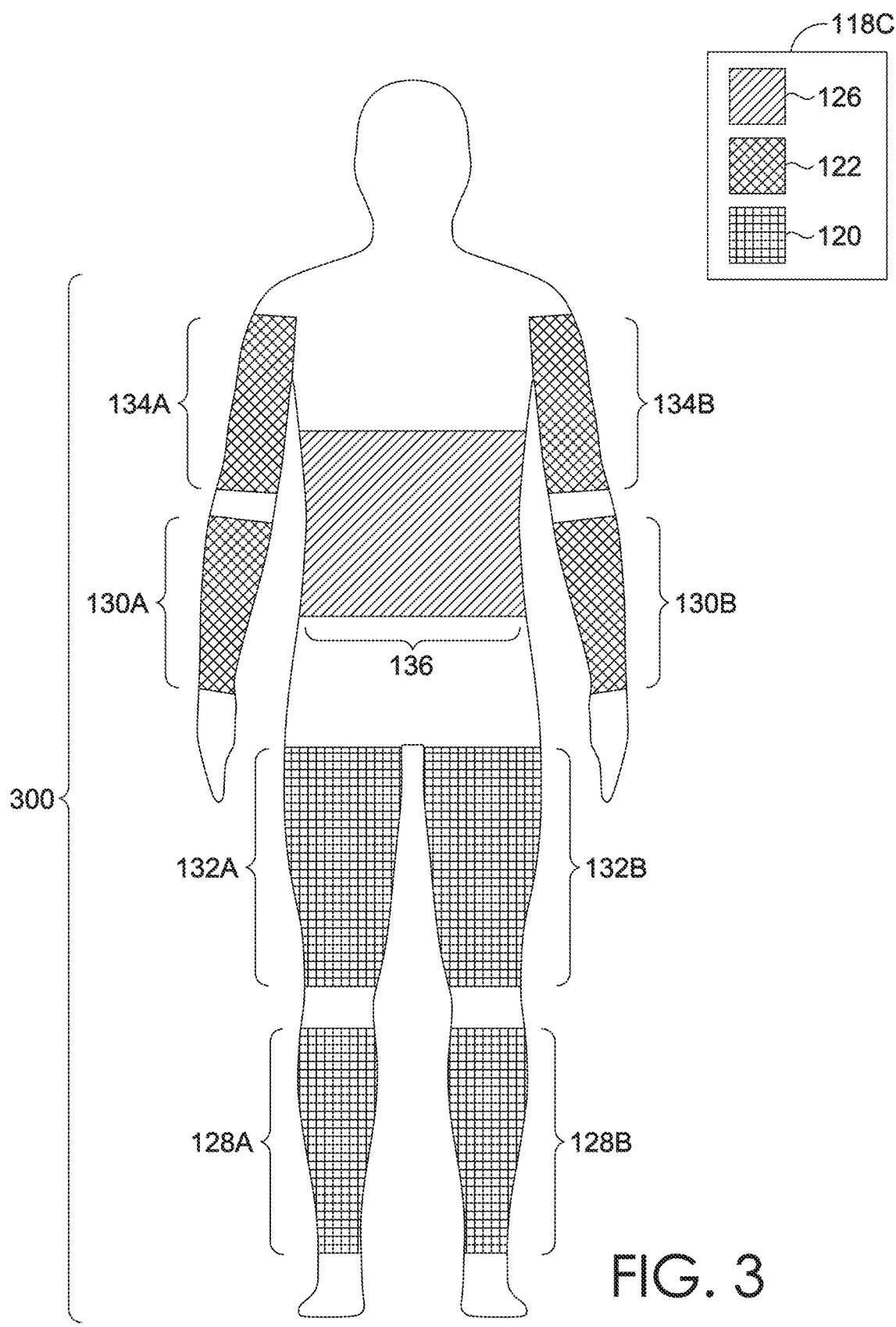
FIG. 3 depicts a third mapping of various vortex-generator patterns in accordance with an aspect hereof.
Figure 4:
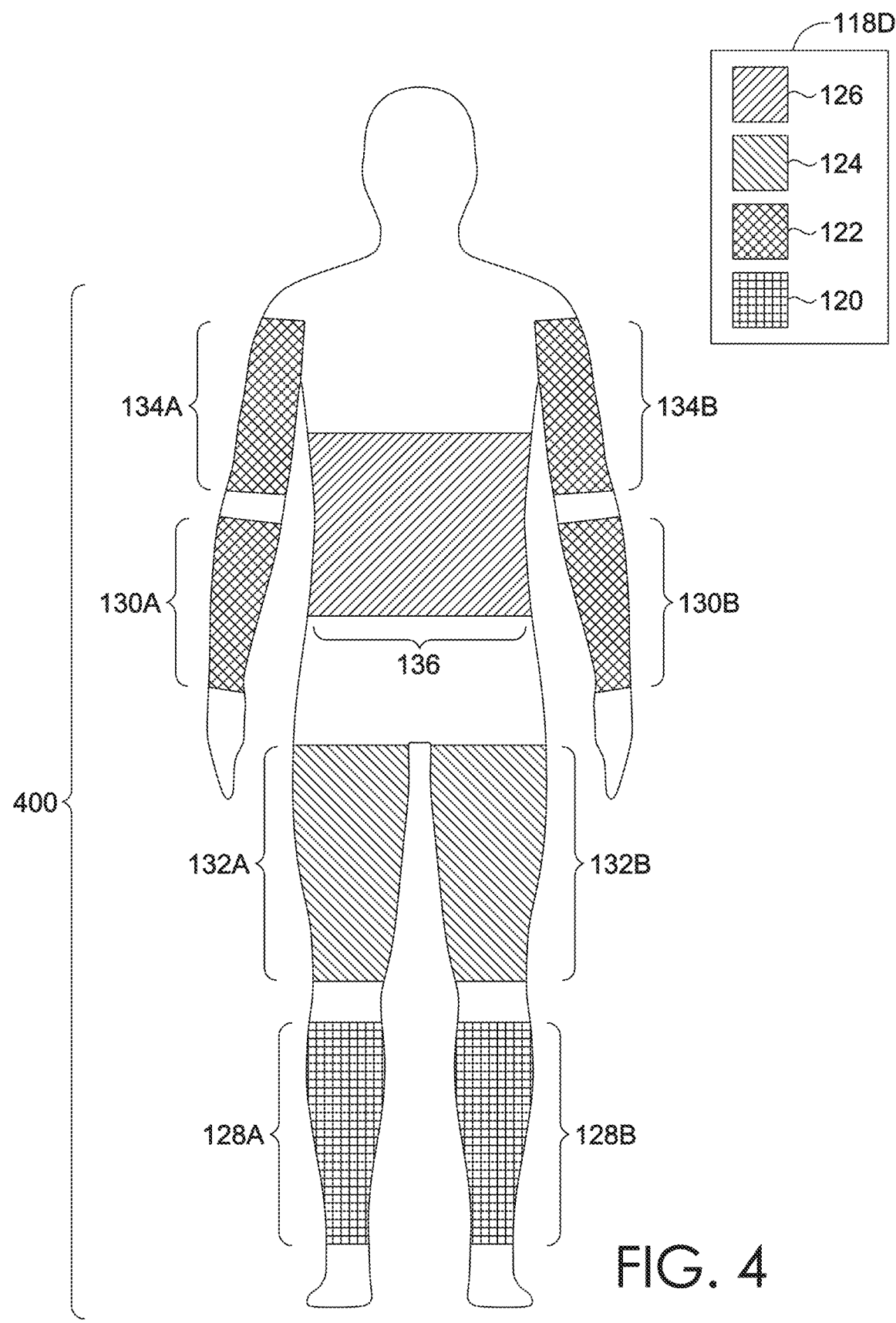
FIG. 4 depicts a fourth mapping of various vortex-generator patterns in accordance with an aspect hereof.

FIG. 1 depicts a first mapping 100 suggesting various patterns of vortex-generator spacing and sizing that might be recommended for a female athlete competing in a shorter or sprint-type event, and FIG. 2 depicts a second mapping 200 suggesting various patterns of vortex-generator spacing and sizing that might be recommended for a female athlete competing in a medium-distance or longer-distance event. FIG. 3 depicts a third mapping 300 suggesting various patterns of vortex-generator spacing and sizing that might be recommended for a male athlete competing in a shorter or sprint-type event, and FIG. 4 depicts a fourth mapping 400 suggesting various patterns of vortex-generator spacing and sizing that might be recommended for a male athlete competing in a medium-distance or longer-distance event. In other words, these mappings provide suggested patterns of vortex generators that could be arranged on a male or female athlete engaging in a particular type of event (e.g., sprint, non-sprint, medium distance, long distance, and the like), in order to receive improved drag-reduction benefits from vortex generators. As will be explained in other portions of this description, these patterns can be applied in different shapes and coverage areas using garments and/or adhesive tape.

There are four different patterns 120, 122, 124, and 126 utilized among the mappings depicted in FIGS. 1-4; however, each of the mappings applies the patterns in a different manner (or not at all) to achieve a desired affect based on the athlete gender and event type. FIGS. 1 and 2 suggest vortex-generator-pattern placement for female athletes, and FIGS. 3 and 4 suggest vortex-generator-pattern placement for male athletes. In addition, FIGS. 1 and 3 suggest vortex-generator-pattern placement for athletes engaging in sprint-type events, which typically include the 100 meter sprint, 200 meter spring, and 400 meter sprint. FIGS. 2 and 4 suggest vortex-generator-pattern placement for athletes engaging in longer-than-sprint events, which typically include running distances longer than 400 meters. Although this description indicates that the mappings depicted in FIGS. 1-4 suggest vortex-generator positioning for certain sprint or running events, in other aspects, some or all of a mapping might be leveraged to position vortex generators for athletes competing in other events, such as throwing events, jumping events, and the like.

As previously mentioned, in FIG. 1 a first mapping 100 is illustrated that shows how various patterns of vortex generators might be prescribed for different areas or zones of a female athlete engaging in an event having a sprint-type activity (e.g., 100 m sprint, 200 m sprint, and 400 m sprint), in accordance with an aspect of the present invention. FIG. 1 includes a legend 118A, which reflects a first vortex-generator pattern 120, a second vortex-generator pattern 122, a third vortex-generator pattern 124, and a fourth vortex-generator pattern 126. The use of different vortex-generator patterns on an athlete engaging in a particular event (e.g., 100 meter sprint) can take advantage of vortex generators in a strategic manner by employing vortex-generator spacing and vortex-generator sizes that provide an amount of drag reduction, while also possibly accounting for other conditions, such as garment weight, breathability, moisture management, and the like.

According to the first mapping 100, the lower leg zones 128A and 128B (i.e., below the athlete's knee) have been coded (i.e., prescribed) with the first vortex-generator pattern 120 to indicate that a set of vortex generators having the first pattern 120 could be positioned in those lower leg zones 128A and 128B to provide an amount of drag reduction. For instance, a pant-style garment or a calf sleeve could be worn having portions that generally align with the distal leg zones 128A and 128 and that are constructed to include the first vortex-generator pattern 120. In addition, adhesive tape constructed to include the first vortex-generator pattern 120 could be applied to the distal leg zones 128A and 128B (i.e., directly to a person's body or to a portion of a garment that covers those zones). In one aspect, the first vortex-generator pattern 120 includes a spacing (i.e., distances 110 and 112)

of 1 cm and includes a vortex-generator height of 3 mm, which is also reflected in Table 1 (below).

The first mapping 100 also indicates that lower arm zones 130A and 130B (i.e., forearm region below the athlete's elbow) have been coded with the second vortex-generator pattern 122 to indicate that a set of vortex generators having the second pattern 122 could be positioned in those lower arm zones 130A and 130B to provide an amount of drag reduction. As indicated in other parts of this description, an athlete might wear a garment (e.g., long-sleeved shirt or detached arm sleeve) having the second pattern 122 over the lower arm zones 130A and 130B and/or might apply an adhesive tape having the second pattern 122 to the distal arm zones 130A and 130B. In one aspect of the invention, the second vortex-generator pattern 122 includes a spacing of 1 cm and a vortex-generator height of 2.5 mm, which is the same spacing as the first pattern 120 with a shorter vortex-generator height. Again, the spacing and sizing of the second pattern 122 is recorded in Table 1 (below).

The first mapping 100 further illustrates that upper leg zones 132A and 132B (i.e., above the athlete's knee) have been coded with the third vortex-generator pattern 124, and the upper arm zones (i.e., 134A and 134B) and torso zone 136 have been coded with the fourth vortex-generator pattern 126. As such, each of these zones can be equipped (e.g., using a garment or tape) with the designated pattern of vortex generators to achieve a desired amount of drag reduction. In one aspect, the third pattern 124 includes a spacing of 1.5 cm and a vortex-generator height of 2.5 mm, and the fourth pattern 126 includes a spacing of 2 cm and a vortex generator height of 2.5 mm.

To help illustrate how the patterns 120, 122, 124 and 126 compare to one another in respective dimensions (e.g., spacing and height) and how the patterns are utilized within the mapping 100 for a female athlete engaging in a sprint-type event, Table 1 is provided below.

TABLE 1

Summary of Vortex-generator (VG) Pattern Mapping for Female Athlete Competing in Shorter-distance Events (e.g., 100 m, 200 m, or 400 m)

| Name (Ref. #) | Visual Code | Spacing | VG Height | Designated Zones |
| --- | --- | --- | --- | --- |
| 1st VG Pattern (120) |  | 1 cm | 3 mm | Lower leg zones |
| 2nd VG Pattern (122) |  | 1 cm | 2.5 mm | Lower arm zones |
| 3rd VG Pattern (124) |  | 1.5 cm | 2.5 mm | Upper leg zones |
| 4th VG Pattern (126) |  | 2 cm | 2.5 mm | Upper arm zones and torso |

Referring now to FIG. 2, a second mapping 200 is illustrated that shows how various patterns 120, 122, and 126 of vortex generators might be prescribed for different areas or zones of a female athlete engaging in events that include at least a medium-distance element (e.g., running more than 400 m), in accordance with an aspect of the present invention. All of the various patterns 120, 122, and 126 reflected in FIG. 2 are also included in FIG. 1, thus the concepts illustrated by the pattern template shown in window 102 apply similarly (e.g., spacing 110 and 112 and vortex-generator height 114). In addition, it is understood that patterns 120, 122, and 126 in mapping 200 include the same spacing and vortex-generator height as the patterns 120, 122, and 126 in mapping 100; however, these patterns 120, 122 and 126 are prescribed in the mapping 200 to zones that are different than the zones prescribed by the mapping 100.

For further clarity, FIG. 2 includes a legend 118B, which reflects the first vortex-generator pattern 120, the second vortex-generator pattern 122, and the fourth vortex-generator pattern 126, which are included in the second mapping 200. As previously indicated, the use of different patterns on an athlete engaging in a particular event (e.g., 800 meter sprint) takes advantage of vortex generators in a strategic manner employing vortex-generator densities and vortex-generator sizes that provide an amount of drag reduction, while also possibly accounting for other desired conditions, such as garment weight, breathability, moisture management, and the like. As previously indicated, each of the anatomical zones identified in the mapping 200 can be equipped (e.g., using a garment or tape) with the designated pattern of vortex generators to achieve a desired amount of drag reduction.

As compared with mapping 100, mapping 200 includes a different usage and distribution of vortex-generator patterns, which is reflective of some level of event-specific, vortex-generator mapping. That is, the vortex-generator mappings (e.g., 100 and 200) are different to take into account event-specific factors, such as anatomy (e.g., arm, leg, torso, etc.) speed, anatomy acceleration, anatomy angular movement, anatomy positions and body form during movement, and anatomy size, among others.

Similar to the mapping 100, the mapping 200 illustrates that, in one instance, the lower leg zones 128A are coded with the first vortex-generator pattern 120, and the torso 140 is coded with the fourth vortex-generator pattern 126. However, in the mapping 200 the lower arms 130A and 130B, the upper legs 132A and 132B, and the upper arms 134A and 134B are coded differently, as compared with the mapping 100. That is, in the mapping 200 the upper arms 134A and 134B are coded with the second vortex-generator pattern 122, but in the mapping 100 the upper arms 134A and 134B are coded with the fourth vortex-generator pattern 126, which includes a larger spacing (lower VG density) than the second pattern 122. In addition, in the mapping 200 the upper legs 132A and 132B are coded with the fourth vortex-generator pattern 126, but in the mapping 100 the upper legs 132A and 132B are coded with the third vortex-generator pattern, which includes a closer spacing (higher VG density) than the fourth pattern 126. Furthermore, in the mapping 200 the lower arms 130A and 130B are coded with the fourth vortex-generator pattern 126, but in the mapping 100 the lower arms 130A and 130B are coded with the second vortex-generator pattern, which includes a closer spacing (higher VG density) than the fourth pattern 126.

In one aspect of the present invention, these different applications of the same vortex-generator patterns within different mappings balances an amount of drag reduction for a particular zone based on anatomical factors (e.g. anatomy position, speed, acceleration, and angular movement) with other attributes (e.g., garment weight and breathability). For instance, a female's lower arms might be pumped at a higher velocity when sprinting in a shorter distance race (e.g., not longer than 400 meters), as compared with a longer distance race (e.g., greater than 400 meters). Thus, the mapping 100 suggests a higher density pattern of vortex generators (e.g., second pattern) in the lower arm zones 130A and 130B, as compared with the mapping 200. Since the lower-arm anatomy of a female athlete, who is engaging in a longer distance race, might not receive the same benefit from a higher density pattern of vortex generators (as compared with a female engaging in a shorter distance race) the mapping 200 suggests a lower density pattern (e.g., fourth pattern 126) in the lower arm zones 130A and 130B.

To help illustrate how the patterns 120, 122, and 126 compare to one another in respective dimensions (e.g., spacing and height) and how the patterns are utilized within the second mapping 200 for a female athlete engaging in at least a medium-distance-type event (i.e., at least 400 meters or longer), Table 2 is provided below.

TABLE 2

Summary of Vortex-generator (VG) Pattern Mapping for Female Athlete Competing in Medium-distance or Long-distance Events (e.g., longer than 400 m)

| Name (Ref. #) | Visual Code | Spacing | VG Height | Designated Zones |
|---|---|---|---|---|
| 1st VG Pattern (120) | | 1 cm | 3 mm | Lower leg zones |
| 2nd VG Pattern (122) | | 1 cm | 2.5 mm | Upper arm zones |
| 4th VG Pattern (126) | | 2 cm | 2.5 mm | Upper leg zones, lower arm zones, and torso |

Referring now to FIG. 3, a third mapping 300 is illustrated that shows how various patterns 120, 122, and 126 of vortex generators might be prescribed for different areas or zones of a male athlete engaging in events that include a shorter or sprint-distance element (e.g., 100 m, 200 m, or 400 m), in accordance with an aspect of the present invention. All of the various patterns 120, 122, and 126 reflected in FIG. 3 are also included in FIGS. 1 and 2, thus the concepts illustrated by the pattern template shown in window 102 apply equally (e.g., spacing 110 and 112 and vortex-generator height 114). In addition, it is understood that patterns 120, 122, and 126 in the third mapping 300 include the same spacing and vortex-generator height as the patterns 120, 122, and 126 in the first and second mappings 100 and 200; however, in the third mapping 300 these patterns 120, 122 and 126 are prescribed to zones of the athlete's anatomy in a manner that is different from both of the first and second mappings 100 and 200. Similar to FIGS. 1 and 2, FIG. 3 also includes a mapping-specific legend 118C that reflects the first vortex-generator pattern 120, the second vortex-generator pattern 122, and the fourth vortex-generator pattern 126, which are included in the third mapping 300.

The third mapping 300 suggests equipping both the upper and lower leg zones 128A, 128B, 132A, and 132B with the first vortex-generator pattern 120. In addition, the third mapping suggests equipping both the upper and lower arm zones 130A, 130B, 134A, and 134B with the second vortex-generator pattern 122. According to the third mapping 300, the torso 136 is equipped with the fourth vortex-generator pattern 126. As previously indicated, the various zones of an athlete might be equipped with a prescribed pattern of vortex generators by wearing a garment constructed with vortex generators and/or by applying an adhesive tape constructed to include vortex generators to a person's body or to a garment.

To help illustrate how the patterns 120, 122, and 126 compare to one another in respective dimensions (e.g., spacing and height) and how the patterns are utilized within the third mapping 300 for a male athlete engaging in a sprint-type or shorter-distance event (e.g., 100 m, 200 m, or 400 m), Table 3 is provided below.

TABLE 3

Summary of Vortex-generator (VG) Pattern Mapping for Male Athlete Competing in Shorter-distance Events (e.g., 100 m, 200 m, or 400 m)

| Name (Ref. #) | Visual Code | Spacing | VG Height | Designated Zones |
|---|---|---|---|---|
| 1st VG Pattern (120) | | 1 cm | 3 mm | Lower leg zones and upper leg zones |
| 2nd VG Pattern (122) | | 1 cm | 2.5 mm | Lower arm zones and Upper arm zones |
| 4th VG Pattern (126) | | 2 cm | 2.5 mm | torso |

Referring now to FIG. 4, a fourth mapping 400 is illustrated that shows how various patterns 120, 122, 124, and 126 of vortex generators might be prescribed for different areas or zones of a male athlete engaging in events that include at least a medium-distance element (e.g., longer than 400 m), in accordance with an aspect of the present invention. All of the various patterns 120, 122, 124, and 126 reflected in the fourth mapping 400 are also included the first mapping 100 (FIG. 1), and patterns 120, 122, and 126 are included in the second mapping 200 and the third mapping 300. Thus, the same concepts apply with respect to vortex-generator spacing and height, and the patterns 120, 122, 124, and 126 in the fourth mapping 400 include the same spacing and vortex-generator height as the patterns 120, 122, 124, and 126 in the other mappings 100, 200, and 300. However, in the fourth mapping 400 these patterns 120, 122, 124, and 126 are prescribed to zones of the athlete's anatomy in a manner that is different from the other mappings 100, 200, and 300. Similar to FIGS. 1-3, FIG. 4 also includes a mapping-specific legend 118D that reflects the first vortex-generator pattern 120, the second vortex-generator pattern 122, the third vortex-generator pattern 124, and the fourth vortex-generator pattern 126, which are included in the fourth mapping 400.

Similar to the third mapping 300, the fourth mapping 400 suggests equipping both the upper and lower arm zones 130A, 130B, 134A, and 134B with the second vortex-generator pattern 122 and equipping the torso zone 136 with the fourth vortex-generator pattern 126. In addition, both the third and fourth mapping suggest equipping the lower leg zone 128A and 128B with the first vortex-generator pattern 120. However, the fourth mapping 400 differs from the third mapping 300 in that the fourth mapping suggests equipping the upper leg zone 132A and 132B with the third vortex-generator pattern 124, which is less dense than the first pattern 120 suggested by the third mapping for the upper leg zone. As previously indicated, the various zones of an athlete might be equipped with a prescribed pattern of vortex generators by wearing a garment constructed with vortex generators and/or by applying an adhesive tape constructed to include vortex generators to a person's body or to a garment.

To help illustrate how the patterns 120, 122, 124 and 126 compare to one another in respective dimensions (e.g., spacing and height) and how the patterns are utilized within the fourth mapping 400 for a male athlete engaging in at least a medium-distance or longer-distance event (e.g., over 400 m), Table 4 is provided below.

TABLE 4

Summary of Vortex-generator (VG) Pattern Mapping for Male Athlete Competing in Medium-distance or Long-distance Events (e.g., longer than 400 m)

| Name (Ref. #) | Visual Code | Spacing | VG Height | Designated Zones |
|---|---|---|---|---|
| 1st VG Pattern (120) | | 1 cm | 3 mm | Lower leg zones |
| 2nd VG Pattern (122) | | 1 cm | 2.5 mm | Lower arm zones and upper |
| 3rd VG Pattern (124) | | 1.5 cm | 2.5 mm | Upper leg zones |
| 4th VG Pattern (126) | | 2 cm | 2.5 mm | Torso |

An aspect of the present invention includes using the various mappings 100, 200, 300, and 400 to construct garments and adhesive tape. Furthermore, although the mappings 100, 200, 300, and 400 refer to either shorter/sprint events or medium/long events, the mappings 100, 200, 300, and 400 might be used to provide benefits in other events in accordance with an aspect of the present invention. For example, various throwing motions are common in events, such as the javelin throw, discus throw, shot put throw/put, and at least part of the mappings 100, 200, 300, and 400 might be used to determine how to equip an athlete engaging in one or more of these events. Likewise, jumping is common in various events, and a further aspect of the present invention includes applying at least part of the mappings 100, 200, 300, and 400 to determine how to equip an athlete competing in jumping event. Various other motions might also benefit from vortex-generator-induced, drag reduction, such as pole vaulting, cycling, skating, skiing, sledding, and snowboarding, among many others.

Vortex-Generator-Enhanced Garments

As indicated in other parts of this description, the mappings 100, 200, 300, and 400 of FIGS. 1-4 can be used as guides to construct garments with particular patterns of vortex generators. As such, the garments can be combined with one another to create a system of vortex generators customized for a particular gender of athlete engaging in a particular type of event.

Referring to FIGS. 5A-5K, various aspects of the present invention are illustrated in which garments have been constructed to include an arrangement of vortex generators having a vortex-generator pattern suggested by one of the mappings 100, 200, 300, and 400. That is, each of the garments depicted in FIGS. 5A-5K are configured to cover one or more of the zones 128A/B, 130A/B, 132A/B, 134A/B, and 136 of a male and/or female athlete. Accordingly, each of the garments in FIGS. 5A-5K are customized to include one or more of the vortex-generator patterns 120, 122, 124, and 126, based on the gender of the athlete and the type of event in which the garment might be worn.

In one aspect of the present invention, the garments depicted in FIGS. 5A-5K are equipped with arrangements of vortex generators, the arrangements being sized and shaped to balance drag reduction with other qualities. For instance, an arrangement might be positioned on a garment at a position in which the boundary layer typically separates from the garment when the garment is worn by a person engaging in a activity. In one aspect, an arrangement is positioned lateral to an anterior-portion midline, such as lateral to a midline along an anterior side of a leg and/or lateral to a midline along an anterior side of a torso. In another aspect, arrangements of vortex generators are omitted from portions of a garment that might receive less drag-reduction benefits from the vortex generators. A further aspect of the present invention includes orienting the vortex generators based on an angular velocity in a particular zone of the athlete (e.g., lower leg zone, upper leg zone, upper arm zone, lower arm zone, torso, and the like).

For example, FIG. 5A depicts one aspect including a right-leg sleeve 502, which includes an anterior portion 504 and a posterior portion 506. The anterior portion 504, which is alignable along an anterior portion of an athlete's lower leg, is constructed to include an arrangement of vortex generators, which includes the first vortex-generator pattern 120 based on the mappings 100, 200, 300, and 400. The right-leg sleeve 502 includes the pattern 120, which is consistently prescribed for the lower leg zone 128A/B in both male and female athletes and in both shorter and longer distance events. Although only the right-leg sleeve 502 is depicted, an aspect of the invention also includes a left-left sleeve that is essentially a mirror image of the right-leg sleeve 502. For example, the orientation of the pattern 120 and the shape of the arrangement of vortex generators might be a mirror image.

In another aspect illustrated by FIG. 5B, exemplary garments include a right-arm sleeve 510A and a left-arm sleeve 510B constructed to include a respective arrangement of vortex generators 512A and 512B. Similar to the leg sleeves described with respect to FIG. 5A, the arm sleeves 510A and 510B might be mirror images of one another. In one aspect, the vortex-generator arrangements 512A and 512B might include the second vortex-generator pattern 122, as suggested by the first, third, and fourth mappings 100, 300, and 400. In another aspect, when the arm sleeves 510A and 510B are to be worn by a female athlete competing in a longer-than-sprint-distance event, the second mapping 200 suggests that the vortex-generator arrangements 512A and 512B should include the fourth pattern 126.

Figure 5D:
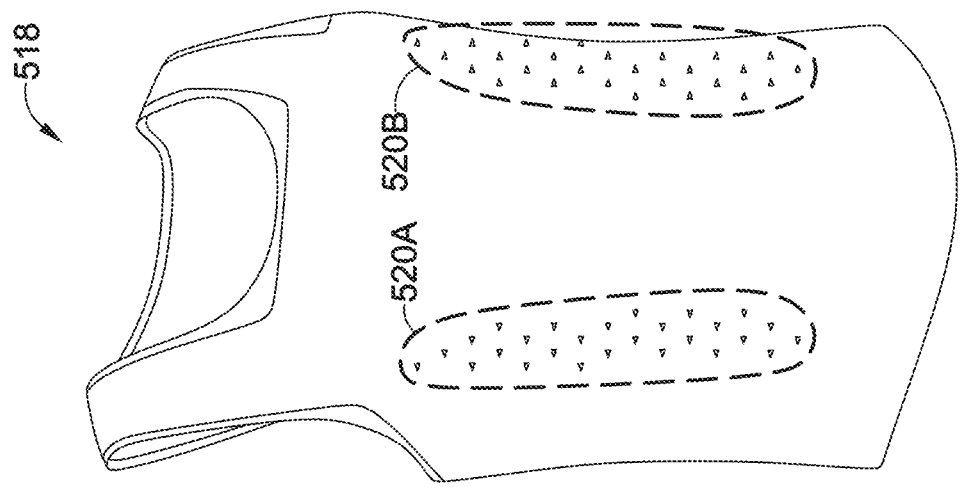
Figure 5C:
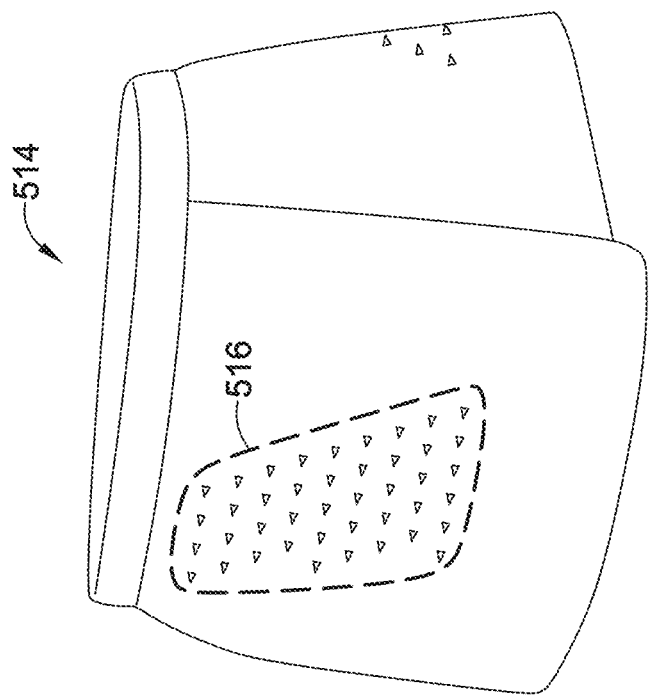

Referring to FIG. 5C, a shorts-type garment 514 is depicted for a male athlete engaging in a longer-than-sprint-type event (e.g., greater than 400 m). The shorts-type garment 514 is constructed to include a vortex-generator arrangement 516 that is alignable in an upper leg zone 132A and 132B when the shorts-type garment 514 is worn. Based on the mapping 400, the vortex-generator arrangement 516 includes the third vortex-generator pattern 124 based on the gender of the athlete and the type of event in which the shorts-type garment 514 might be worn.

Referring to FIGS. 5D and 5E, sleeveless-shirt-type garments 518 and 522 are depicted for a male athlete. For example, the garment 518 might be a singlet-style garment worn by male athletes competing in longer-than-sprint-type events, and the garment 522 might be a worn by a male athlete competing in a sprint-type event. Both of the sleeveless-shirt-type garments 518 and 522 are constructed to include a vortex-generator arrangement 520A/B and 524A/B that is alignable in a torso zone 136 when each garment 518 and 522 is worn. Based on the mappings 300 and 400, the vortex-generator arrangements 520A/B and 524A/B both include the fourth vortex-generator pattern 126 based on the gender of the athlete and the type of event in which each of the garments 518 and 522 might be worn.

Figure 5F:
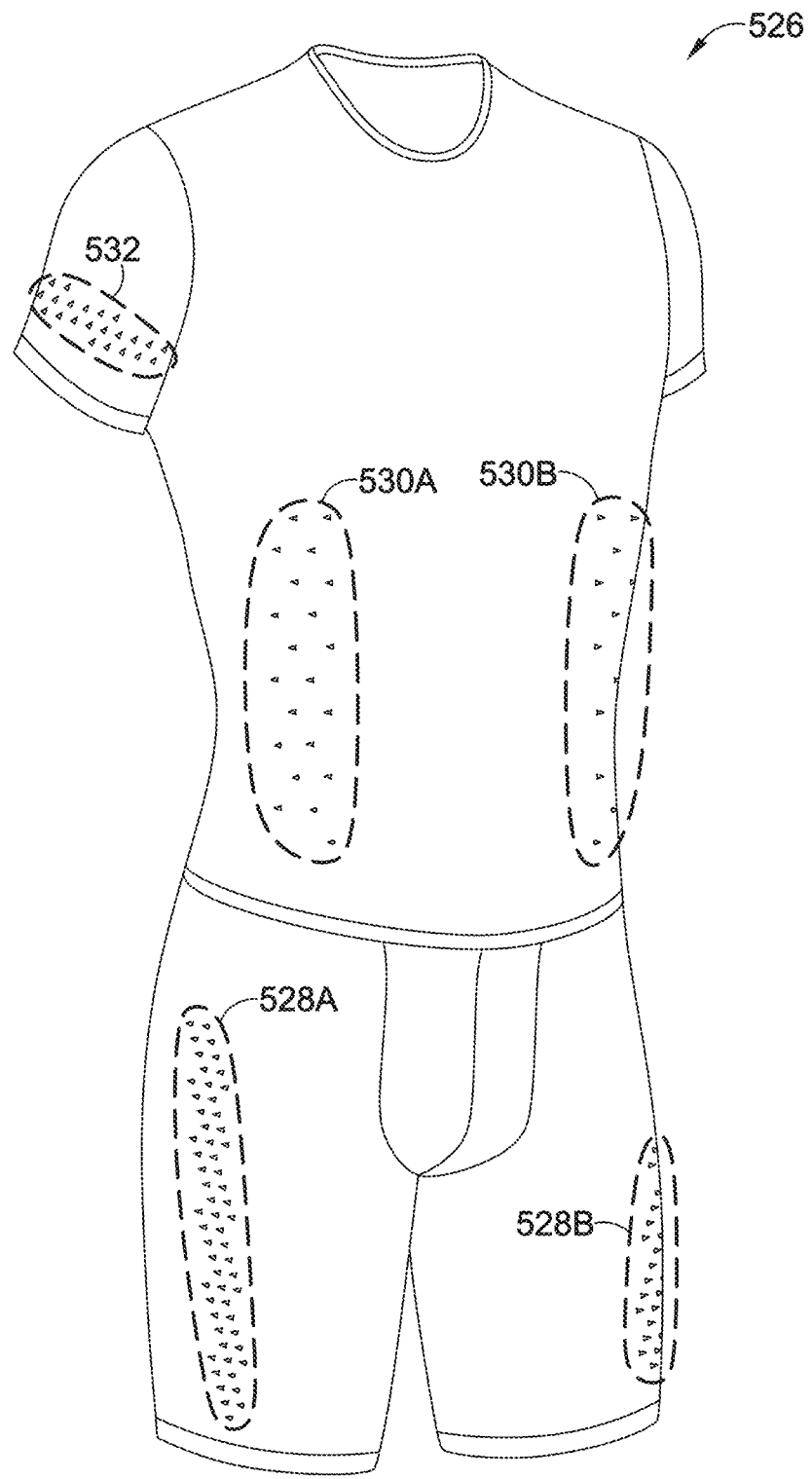

FIG. 5F depicts another aspect of the present invention, which includes a unitard-style garment 526 for a male athlete engaging in a sprint-type event. The unitard-style garment 526 is constructed to include a plurality of vortex-generator arrangements 528A/B, 530A/B, and 532 that are alignable with upper leg zones 132A and 132B, a torso 136, and upper arm zones 134A/B (respectively) when the unitard-style garment 526 is worn. Based on the mapping 300, the vortex-generator arrangements 528A/B includes the first pattern 120, the arrangements 530A/B include the fourth pattern 126, and the arrangement 532 includes the second pattern 122 to provide specificity for the gender of the athlete and the type of event in which the unitard-style garment 526 might be worn. Although the unitard garment 526 is illustrated with sleeve portions, in other aspect, the unitard garment might be sleeveless. In addition, another aspect might include portions of the unitard that include the same vortex-generator arrangements and that are separate from one another in either a shorts-only garment, a shirt-only garment, or a singlet-only garment.

Figure 5H:
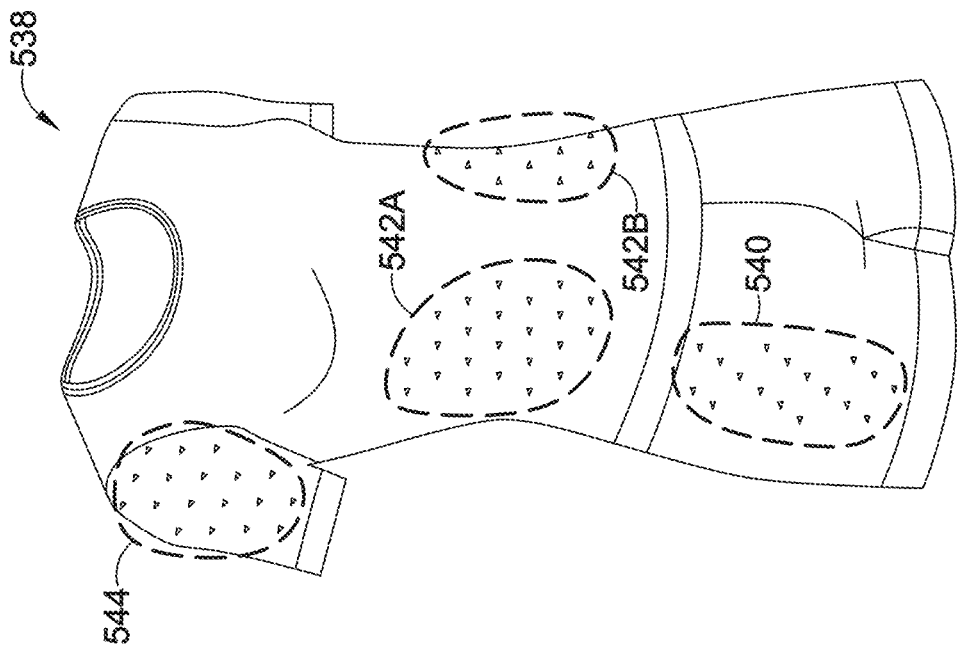
Figure 5G:
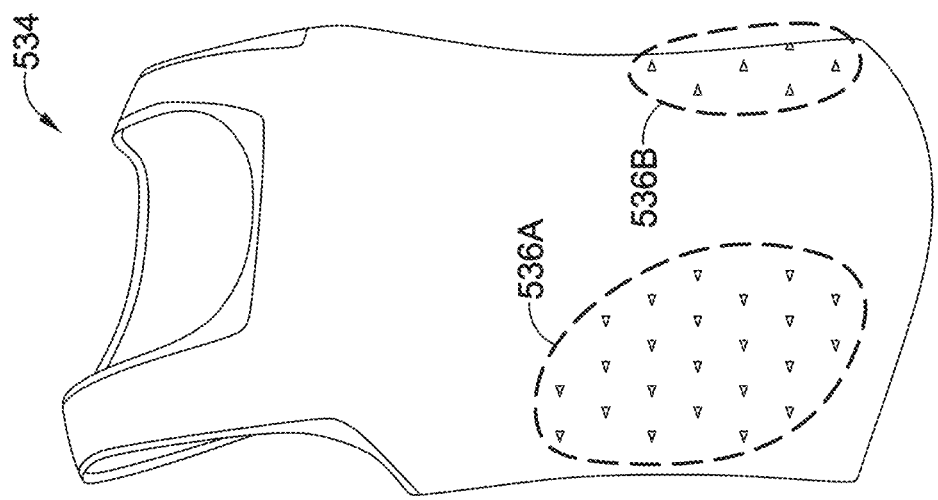
Figure 5J:
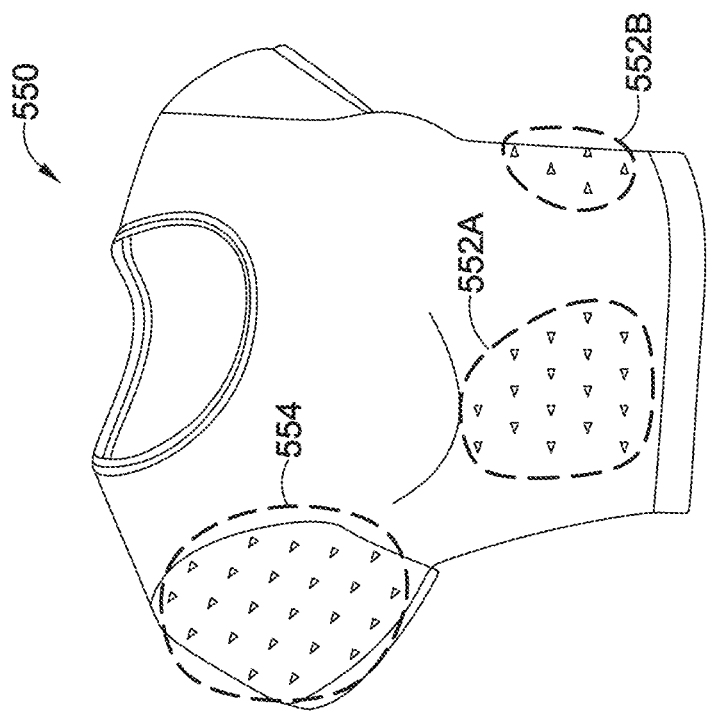

Referring to FIGS. 5G and 5K, sleeveless-shirt-type garments 534 and 556 are depicted for a female athlete. For example, the garment 534 (FIG. 5G) might be a singlet-style garment worn by female athletes competing in longer-than-sprint-type events, and the garment 556 (FIG. 5K) might be a worn by a female athlete competing in a sprint-type event. Both of the sleeveless-shirt-type garments 534 and 556 are constructed to include a vortex-generator arrangement 536A/B and 558A/B (respectively) that is alignable in a torso zone 136 when each garment 534 and 558 is worn. Based on the mappings 100 and 200, the vortex-generator arrangements 536A/B and 558A/B both include the fourth vortex-generator pattern 126 based on the gender of the athlete and the type of event in which each of the garments 534 and 556 might be worn.

FIG. 5H depicts another aspect of the present invention, which includes a unitard-style garment 538 for a female athlete engaging in a sprint-type event. The unitard-style garment 538 is constructed to include a plurality of vortex-generator arrangements 540, 542A/B, and 544 that are alignable with upper leg zones 132A and 132B, a torso zone 136, and upper arm zones 134A/B (respectively) when the unitard-style garment 538 is worn. Based on the mapping 100, the vortex-generator arrangement 540 includes the third pattern 124, the arrangements 542A/B include the fourth pattern 126, and the arrangement 544 includes the fourth pattern 126 to provide specificity for the female gender of the athlete and the type of event in which the unitard-style garment 538 might be worn. Although the unitard garment 538 is illustrated with sleeve portions, in other aspect, the unitard garment might be sleeveless. In addition, another aspect might include portions of the unitard that include the same vortex-generator arrangements and that are separate from one another in either a shorts-only garment, a shirt-only garment (e.g., FIG. 5J), or a singlet-only garment.

Figure 5I:
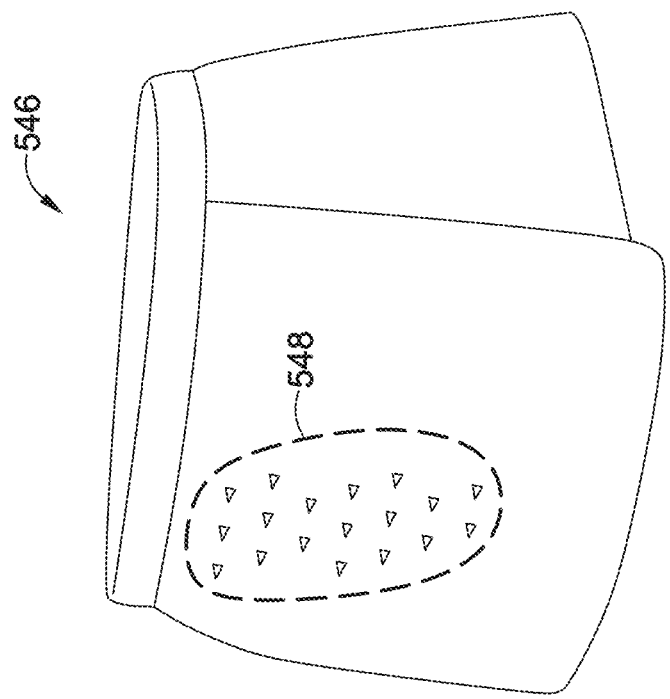

Referring to FIG. 5I, a shorts-type garment 546 is depicted for a female athlete engaging in a longer-than-sprint-type event (e.g., greater than 400 m). The shorts-type garment 546 is constructed to include a vortex-generator arrangement 548 that is alignable in an upper leg zone 132A and 132B when the shorts-type garment 546 is worn. Based on the mapping 200, the vortex-generator arrangement 548 includes the fourth vortex-generator pattern 126 to provide gender specificity (i.e., female) and event specificity.

FIGS. 5A-5K provide examples of garments on which vortex generators might be applied, in accordance with aspects of the present invention. However, vortex generator might be applied to various other types of garments, such as headwear (e.g., cap, helmet, beanie, etc.), handwear (e.g., gloves, mittens, hand braces, etc.), and footwear (e.g., running flats, track spikes, cleats, basketball shoes, and cross-training shoes, among many others). In other aspects, event specific articles might be enhanced with vortex generators, such as a javelin sleeve to be worn on a throwing arm.

In a further aspect, vortex generators are positioned on a footwear article at regions of the footwear at which the boundary layer separates from the outer surface of the footwear. In another aspect, the vortex generators are positioned to include a particular angular orientation relative to a ground surface at a particular positioning in a running stride. For example, a region (e.g., shoe upper) of a footwear article might experience a respective velocity having an angular orientation with respect to the upper surface when the article is about to be pulled off of the ground (i.e., by runner). Thus in one aspect, vortex generators might be angled to point in a direction of the velocity on the particular region to account for the angular orientation of the velocity. These angles might be different based on the type of event or the athlete. For example, in some events, angular velocities might include angles of about 79 degrees or 55 degrees, depending on where the article is in the stride. In other contexts (i.e., event and/or athlete) the upper might experience angular velocities oriented at about 130 degrees or 42 degrees relative to the plane of the upper, depending on where the article is in the stride.

Vortex-Generator-Enhanced Adhesive Tape

In another aspect of the present invention, a vortex-generator applique is constructed to include an arrangement of vortex generators. Accordingly the arrangement of vortex generators can be selectively applied to one or more particular zones of a person's body, such as by applying the applique to a garment or directly to the person's body. In addition, the applique can be constructed to include one or more vortex-generator patterns, such as one or more of the patterns 120, 122, 124, or 126 (i.e., VG-enhanced tape). As such, each one of the patterns 120, 122, 124, and 126 can be selectively applied to one or more particular zones of a person's body. The patterns 120, 122, 124, and 126 are merely exemplary of some patterns in accordance with one aspect of the disclosure, and a VG-enhanced applique may be constructed to include other patterns in accordance with other aspects of the disclosure.

Referring to FIG. 6A, an exemplary adhesive-tape strip 610 (e.g., applique) is depicted that is attachable to various zones of an athlete's body (i.e., to a garment or directly to the person's body). In FIG. 6A, the strip 610 includes an outward-facing surface 612, which faces away from the athlete's skin surface when the strip 610 is attached to the athlete and faces away from the surface of a garment to which the strip may be attached. The adhesive-tape strip 610 is constructed such that an arrangement of vortex generators (e.g., 614A-F) is affixed to the outward-facing surface 612. The arrangement of vortex generators can be configured to include any desired spacing or vortex-generator size, and in one aspect of the present invention, the arrangement of vortex generators includes the spacing and sizing set forth in one or more of the patterns 120, 122, 124, and 126. As such, one or more of the adhesive-tape strips 610 are attachable to any of the zones 128A/B, 130A/B, 132A/B, 134A/B, and/or 136 to selectively apply one or more vortex-generator patterns. For example, if the adhesive-tape strip 610 is constructed to include the first vortex-generator pattern 120, then a male or female athlete engaging in a sprint-type event might apply the adhesive-tape strip to his or her lower leg region 128A/B.

FIG. 6B depicts a cross-sectional, schematic view of the adhesive-tape strip 610, taken across the cross-sectional reference line depicted in FIG. 6A, in accordance with an aspect of the present invention. In FIG. 6B, the adhesive-tape strip 610 includes the outward-facing surface 612 of a base-layer substrate layer 616. The base-layer substrate 616 might include an elastic layer (e.g., elastomeric and flexible fabric) configured to stretch uni-directionally (e.g., in length) or bi-directionally (e.g., length and width) to provide a desired force against an applied-to surface (e.g., an athlete's skin surface). In addition, the base-layer substrate might be designed to provide a desirable amount of breathability and/or moisture tolerance. The base-layer substrate 616 might be constructed of a natural fiber (e.g., cotton), a synthetic fiber, or a combination thereof. In one aspect, the base-layer substrate 616 is a type of base-layer substrate used to construct elastic therapeutic tape (e.g., kinesio tape).

The adhesive-tape strip 610 also includes a first adhesive layer 618 applied to an inward-facing surface of the base-layer substrate 616, the inward-facing surface generally opposing the outward-facing surface 612 and facing towards an athlete's skin surface (or towards a garment) when the strip 610 is coupled to the athlete's skin surface (or to a garment). The first adhesive layer 618 might have various properties making the adhesive-tape strip 610 suitable for application to human skin in a therapeutic or supportive context, such as non-irritation properties, heat-activation properties, and the like.

In one aspect, the adhesive-tape strip 610 includes a removable backing layer 620 that covers the adhesive layer 618 prior to the strip 610 being applied to an athlete. The removable backing layer 620 can then be peeled away from the strip 610 to uncover the adhesive layer 618. The backing layer 620 may also be used as a vehicle onto which to print instructions for how and where to apply the adhesive-tape strip 610. For example, if the adhesive-tape strip 610 includes an arrangement of vortex generators that include the first pattern 120, then the backing layer 620 might include an explanation of the zones on the athlete's body (e.g., 128A/B) to which it is suggested to apply the strip 610. However, in other aspects, the removable backing layer 620 might be omitted when the strip 610, and the strip 610 is rolled up to cover the adhesive layer prior to applying the strip to an athlete.

In a further aspect, the adhesive-tape strip 610 includes a second adhesive layer 622A and 622B that bonds the vortex generators 614A and 614B to the outward-facing surface 612 of the strip 610. As indicated above, the depiction provided by FIG. 6B is schematic in nature and is not necessarily meant to illustrate or depict accurate scaling of layer thickness or vortex-generator sizing or spacing.

Vortex-Generator Kit

In an aspect of the present invention, garments, tape, or both garments and tape, are combinable into a kit to provide a system of vortex generators that may be used to apply one or more pattern selection and placement suggested by a vortex-generator mapping. For example, a kit might include a combination of garment(s) and/or tape having various vortex-generator patterns matching at least part of one or more of the mappings 100, 200, 300, and 400. In addition, the kit might include a set of instructions suggesting where VG-enhanced tape can be worn by an athlete, consistent with a particular mapping.

For example, a first kit might be configured for a male athlete competing in a sprint-type event (e.g., 100 meter dash, 200 meter dash, or 400 meter dash), the first kit including one or more garments, VG-enhanced tape, or both garment(s) and VG-enhanced tape that is combinable to provide a system of vortex generators that applies the pattern selection and placement designated in the third vortex-generator mapping 300. Among other garment items, the first kit might include the unitard garment 5F (with or without sleeves) and/or independent shorts and singlet 5E.

In addition, the first kit might include leg sleeves (e.g., 5A) including the first pattern 120 and arm sleeves including the second pattern 122.

In a further aspect of the disclosure, the first kit for a male sprinter might include a first set of VG-tape strips having the first vortex-generator pattern 120 and a second set of VG-tape strips having the second vortex-generator pattern 122. The kit might also include instructions suggesting the placement of the first set of VG-tape strips (e.g., at an area corresponding with lower leg zone 128A/B) and a different placement of the second set of VG-tape strips (e.g., at areas corresponding with upper and lower arm zones). The kit may or may not include tape with the fourth vortex-generator pattern 126 for placement in an area corresponding with the torso or abdomen.

Figure 7:
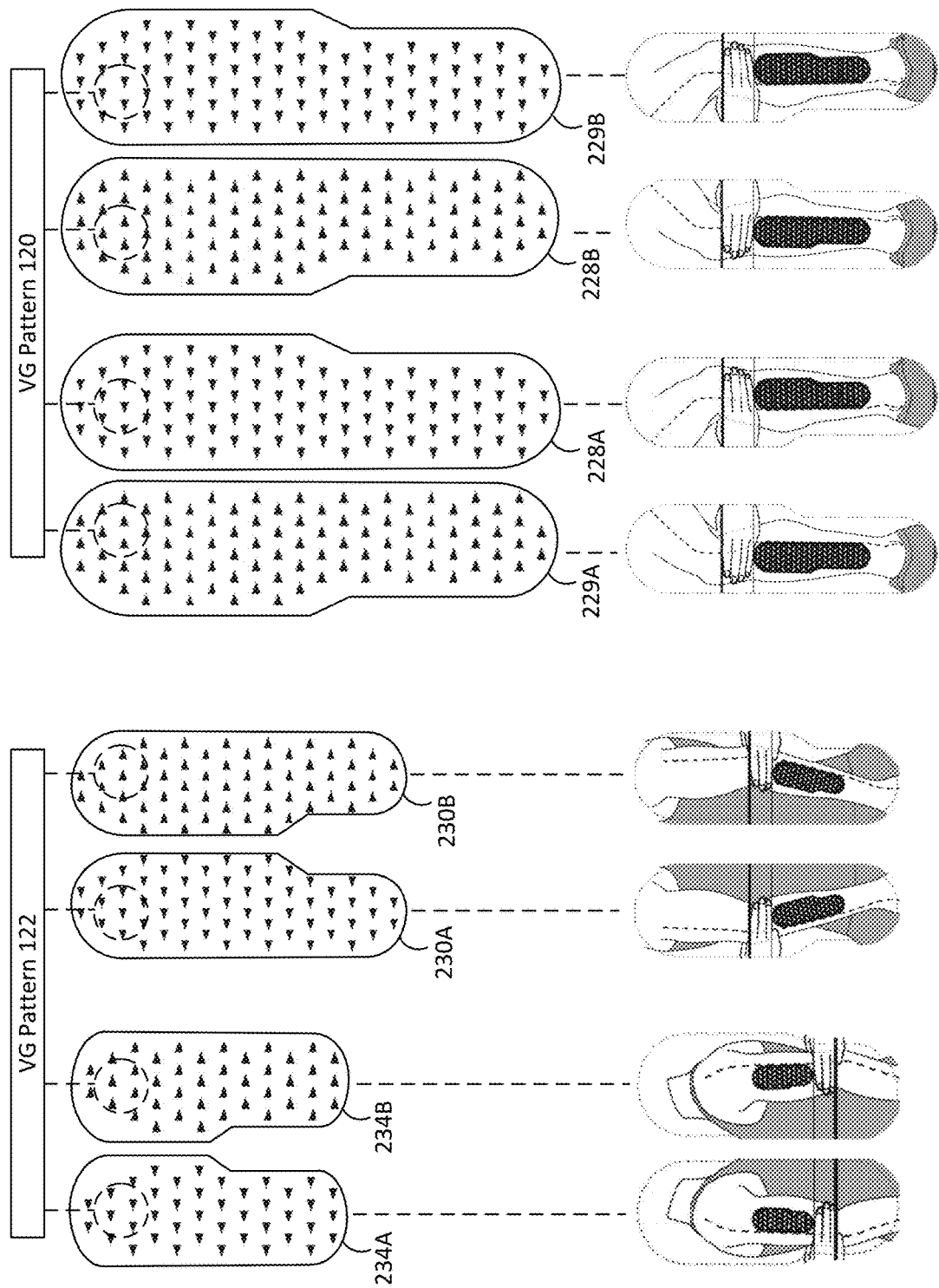
FIG. 7 depicts at least part of a vortex-generator kit in accordance with an aspect hereof.
Figure 8:
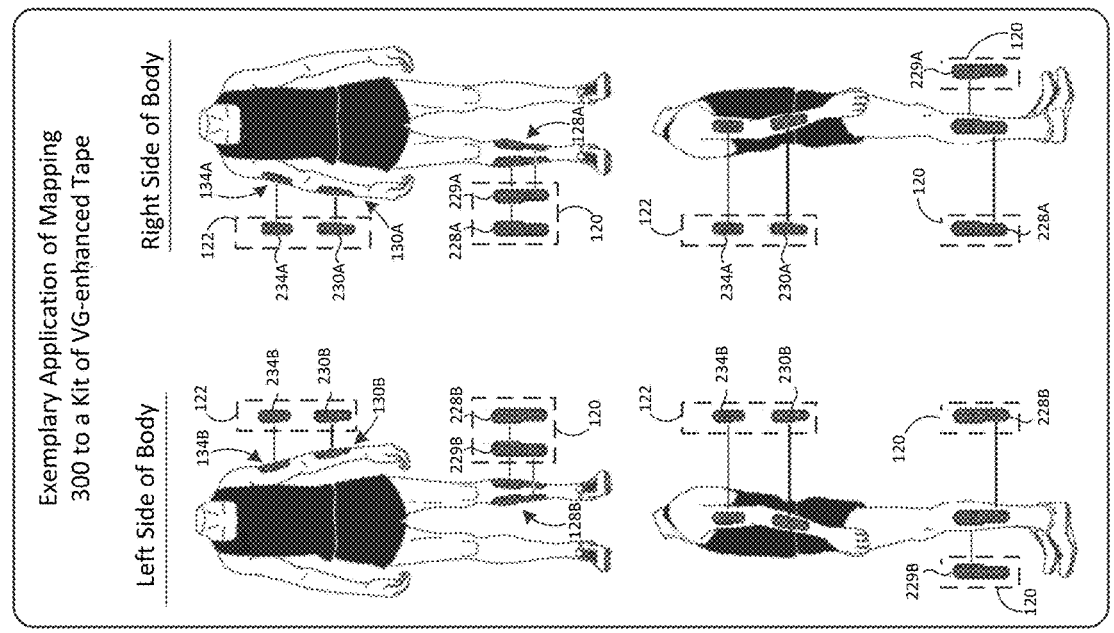
FIG. 8 illustratively conveys the application of the vortex-generator kit of FIG. 7 based on a mapping in accordance with an aspect hereof.
Figure 8:
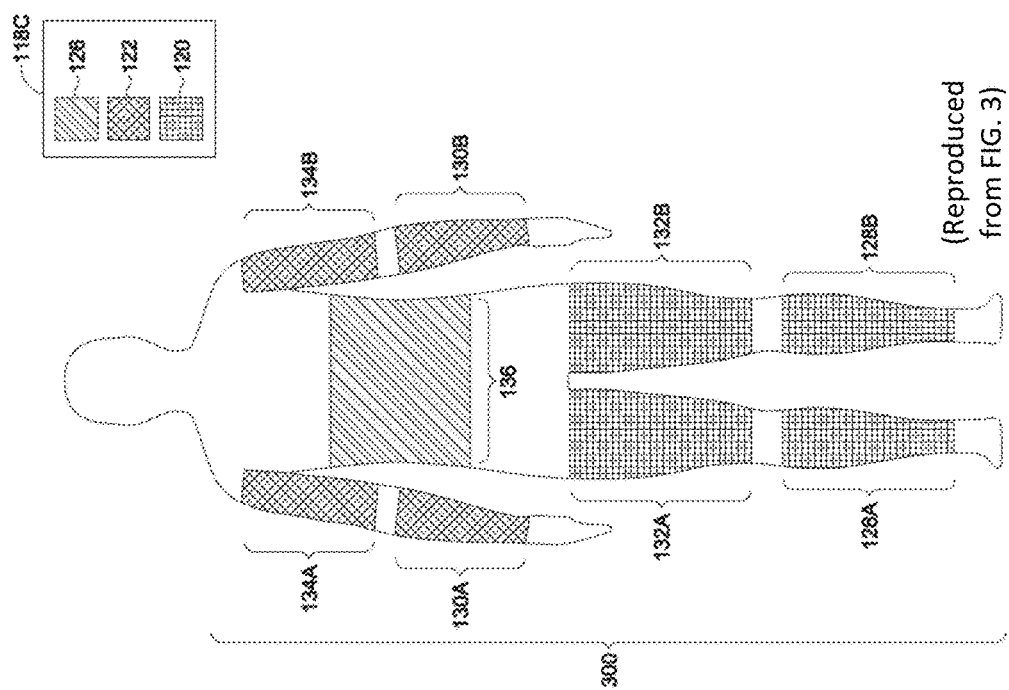

Referring now to FIGS. 7 and 8 an exemplary kit of VG-enhanced tape is depicted. FIG. 7 includes a VG-enhanced applique 234A for an upper portion of a right arm, a VG-enhanced applique 234B for an upper portion of a left arm, a VG-enhanced applique 230A for a lower portion of a right arm, a VG-enhanced applique 230B for a lower portion of a left arm, a VG-enhanced applique 228A for lateral side of a lower right leg, a VG-enhanced applique 229A for a medial side of a lower right leg, a VG-enhanced applique 228B for lateral side of a lower left leg, and a VG-enhanced applique 229B for a medial side of a lower left leg. In an aspect of the present invention, the appliques 230A/B, 234A/B, 228A/B, and 229A/B are combined into a set of appliques that may be usable by a person to achieve an amount of drag reduction. Furthermore, the set of appliques may be used to apply vortex generators to a person in a manner consistent with at least part of one or more of the mappings 100, 200, 300, and 400. For example, the set of appliques may be used by a male sprinter in a manner consistent with the mapping 300 depicted in FIG. 3.

In FIG. 7, directly below the depiction of each applique is an illustration of pictorial instructions depicting how to attach a respective applique to a person. As explained in other portions of this disclosure, the instructions may be printed on the removable backing layer 620 or may be printed on the substrate layer 616. All of the appliques depicted in FIG. 7 might be worn by a person at the same time when competing in an event and in a manner consistent with the mapping 300. In other aspects, less than all of the appliques might be worn during an event, but the appliques may still be positioned relative to the person's body in a manner consistent with the mapping 300. Additional appliques may be combined with the appliques depicted in FIG. 7, such that a person wears more appliques than those depicted in FIG. 7 for a particular event.

Reference is now made to FIG. 8, which further illustrates that a kit or system of vortex-generator tape may be used to achieve an amount of drag reduction in a manner consistent with a mapping. FIG. 8 includes a reproduction of FIG. 3 for illustrative purpose, the reproduction including a depiction of the mapping 300. FIG. 8 also illustrates one manner in which the appliques 230A/B, 234A/B, 228A/B, and 229A/B might be applied in a manner that is consistent with the mapping 300. For example, the appliques 230A/B might be applied to the lower portions 130A/B of the right and left arms (respectively). In FIG. 8, the appliques 230A/B are outlined by a respective box that is labeled with reference numeral 122 to illustratively convey that the appliques 230A/B may be constructed to include a vortex-generator pattern that is consistent with the pattern 122. In addition, the appliques 234A/B might be applied to the upper portions 134A/B of the right and left arms (respectively). In FIG. 8, the appliques 234A/B are also outlined by a respective box that is labeled with reference numeral 122 to convey that the appliques 234A/B may be constructed to include a vortex-generator pattern that is consistent with the pattern 122. As further depicted in FIG. 8, the appliques 228A/B and 229A/B might be applied to the lower portions 128A/B (e.g., calf, shin, and the like) of the right and left legs (respectively). In FIG. 8, the appliques 228A/B and 229A/B are outlined by a respective box that is labeled with reference numeral 120 to convey that the appliques 234A/B may be constructed to include a vortex-generator pattern that is consistent with the pattern 120.

The kit of vortex generators depicted in FIGS. 7 and 8 is merely exemplary, and a vortex-generator kit might include various other combinations of articles (e.g., garments, tape, or a combination of garments and tape) constructed to include vortex generators in various patterns. These patterns may be consistent with at least part of a mapping and may be prescribed for a particular zone of a person. As explained in other parts of this specification, a kit may or may not include articles that are applied to every zone identified in the mappings 100, 200, 300, and 400. Even though a kit may omit an article that corresponds with a particular region (e.g., upper leg region 132A/B), the kit may still provide vortex-generator-enhanced articles in a manner that is consistent with a mapping. For instance, the kit depicted in FIG. 7 omits a vortex-generator-enhance article that can be applied to the upper leg region 132A/B, but the kit in FIG. 7 still provides a system of vortex generators based on the mapping 300.

In other aspects, a size of the vortex-generator-enhanced articles may increase or decrease to accommodate different body dimensions, such as height. For instance, a kit for taller athletes may include VG-enhanced tape that is longer than a kit for shorter athletes. In this case, the VG-patterns may be the same between the two kits, even though the longer VG-enhanced tape may include additional vortex generators covering the additional length.

Various other kits are also contemplated within the scope of aspects of the invention, such as kits customized for male athletes competing in longer-than-sprint-type events (e.g., longer than 400 meters), female athletes competing in longer-than-sprint-type events, and female athletes competing in sprint-type events. Each of these kits includes one or more garments (e.g., shorts, pants, shirts, tanks, sleeves, etc.), VG-enhanced tape, or a combination thereof to provide a system of vortex generators that applies the pattern selection and placement suggested by a respective vortex-generator mapping.

Method of Making VG-Enhanced Article

Figure 9:
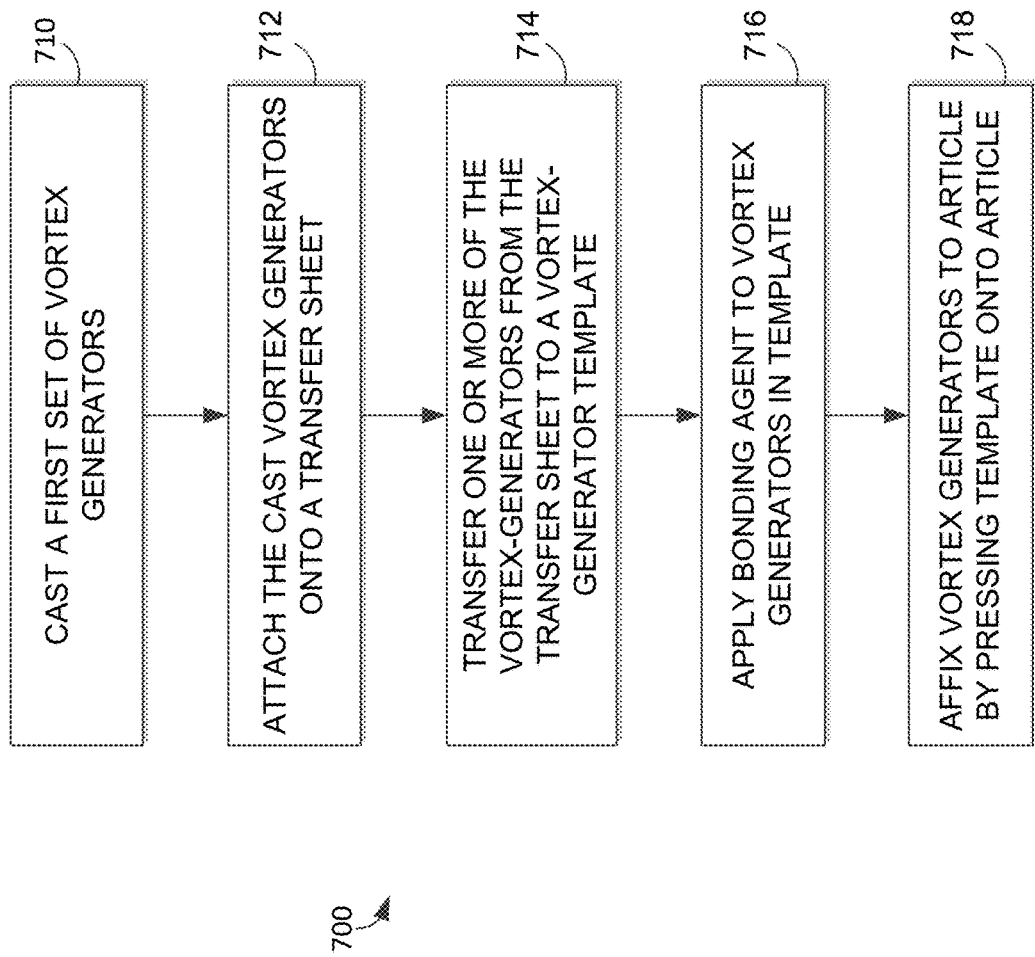
FIG. 9 depicts a flow chart of a method for making a vortex-generator-enhanced article in accordance with an aspect hereof.

Vortex-generator enhanced articles, such as garments or tape, can be constructed using various techniques. Referring to FIG. 9 a flow chart depicts a series of steps that, when executed, carry out a method 700 of constructing a VG-enhanced article, in accordance with an aspect of this invention. A VG-enhanced article includes an article (e.g., garment, equipment, or tape) that includes one or more vortex generators coupled (e.g., adhered, molded to, cast to, etc.) to a surface of the article.

In one aspect, step 710 includes casting a first set of vortex generators by pouring a material (e.g., silicone, polyurethane, thermoplastic polyurethane, etc.) into a mold having a first set of mold cavities, each of which includes a shape of each vortex generator of the first set of vortex generators. The mold might include various configurations, and in one aspect, the mold includes a substantially flat plate having rows of vortex-generator cavities aligned side-by-side. In a further aspect, the vortex generator cavities might be oriented in the mold, such that the vortex-generator base is positioned toward an open portion of the cavity into which the material is poured. The material poured into the mold cavities is hardened, dried, cured, etc. by applying an appropriate process (e.g., heating, cooling, drying, pressurized, vulcanized, and the like).

Step 712 includes coupling the cast vortex generators to a transfer sheet, in one aspect of the method 700. For example, when the base of the vortex generator is cast towards the open portion of the mold cavity, then an adhesive might be applied to the base, and the transfer sheet might be pressed against the vortex generator base to remove the vortex generator from the mold cavity. In this respect, adhesive can be applied to all of the vortex-generator bases in the same step to allow all (or substantially all) of the cast vortex generators to be removed from the mold using the transfer sheet. In another aspect, an adhesive might be applied to the transfer sheet to remove the cast vortex generators without applying an adhesive to the vortex-generator bases.

In a further aspect, step 714 includes transferring one or more of the vortex-generators from the transfer sheet to a vortex-generator template, which may include a grid of vortex-generator-receiving cavities, each of which allows a vortex-generator to be positioned therein with a base of the vortex-generator facing away from the cavity. An exemplary vortex-generator template includes a set of vortex-generator slots for receiving a set of vortex generators to be arranged into a pattern formed by the vortex-generator slots. For example, a template might include a grid of vortex-generator slots that are arranged in a sheet and organized into rows having a consistent spacing. In one aspect, the rows and the spacing of the template are configured to create one or more of the patterns 100, 200, 300, and 400. For example, a separate template might be used for each of the patterns 100, 200, 300, and 400. Or in another aspect, the vortex-generator slots and rows might include a spacing that allows the same template to be used to create more than one of the patterns. For example, if the template slots and rows included a spacing of 0.5 cm, then the template could be used to create more than one of the patterns 100, 200, 300, and 400 by transferring vortex generators into only select ones of the slots.

Once the vortex generators are placed in the appropriate slots in the template that form a desired pattern (e.g., 100, 200, 300, or 400), step 716 includes applying a bonding agent (e.g., layers 622A and 622B in FIG. 6B) to the base of each of the vortex generators, the base facing out of the template cavity. In step 718, the template is then pressed onto a select article to bond or adhere the vortex generators to the article in the pre-set pattern. For example, the template might be pressed onto a garment layer, tape, or athletic equipment. The one or more vortex generators might be affixed to an article layer using various methods. For example, in one aspect, the bonding agent is a pressure activated agent that adheres to the article layer when the one or more vortex-generators are pressed onto the article layer. In another aspect, the bonding agent might be heat activated, in which case a heat-providing device (e.g., heat gun) is used to cure the bonding agent when the one or more vortex generators are positioned on the article layer. In a further aspect, a vacuum filter might be utilized to hold the one or more vortex generators in position on the article layer while the bonding agent is curing (e.g., while pressure or heat is applied).

Vortex-generator-enhanced articles might be manufactured using other techniques as well. For example, in one aspect, one or more vortex generators might be 3D printed directly onto an article layer. In another aspect, one or more vortex generators might be 3D printed in an initial step and then bonded to an article layer. And in an alternative aspect, one or more vortex generators might be integrally molded with an article layer, such as in a co-molding process, injection molding, or successive molding process.

Structure of One or More Vortex Generators

A vortex generator that is used to enhance a garment (e.g., FIGS. 5A-5K), tape (e.g., FIGS. 6A and 6B), or other athletic equipment might have various structures. Generally, a vortex generator includes a vane for affecting a boundary layer of a flow of a fluid medium (e.g., air or water) passing over the surface of an article (e.g., garment or tape donned by an athlete or equipment used in a sporting event). In addition, a vortex generator typically includes a base for attaching the vane to the article. In one aspect of the present invention, a vortex generator includes a dart-shaped vane in combination with different types of bases. For instance, FIGS. 10A-10D illustrate the dart-shaped vane with a first type of base and FIGS. 11-14 illustrate the dart-shaped vane with other types of bases. However, in other aspects, a vortex generator might include a vane having a configuration that is different from the dart-shaped configuration.

Figure 10B:
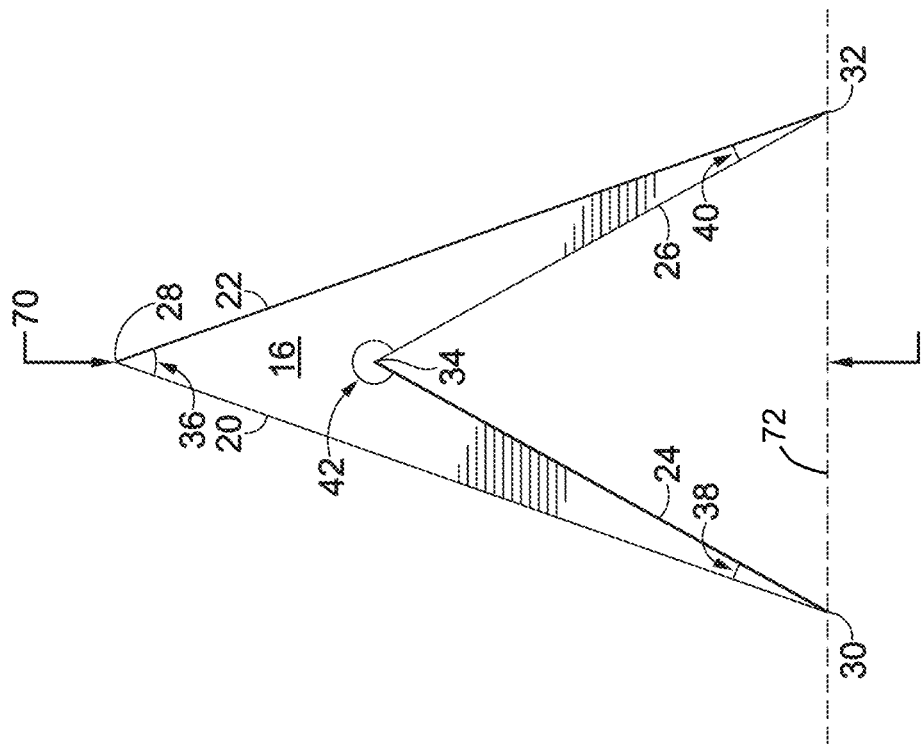
FIG. 10B depicts a bottom elevation of the vortex generator depicted in FIG. 10A in accordance with an aspect hereof.
Figure 10A:
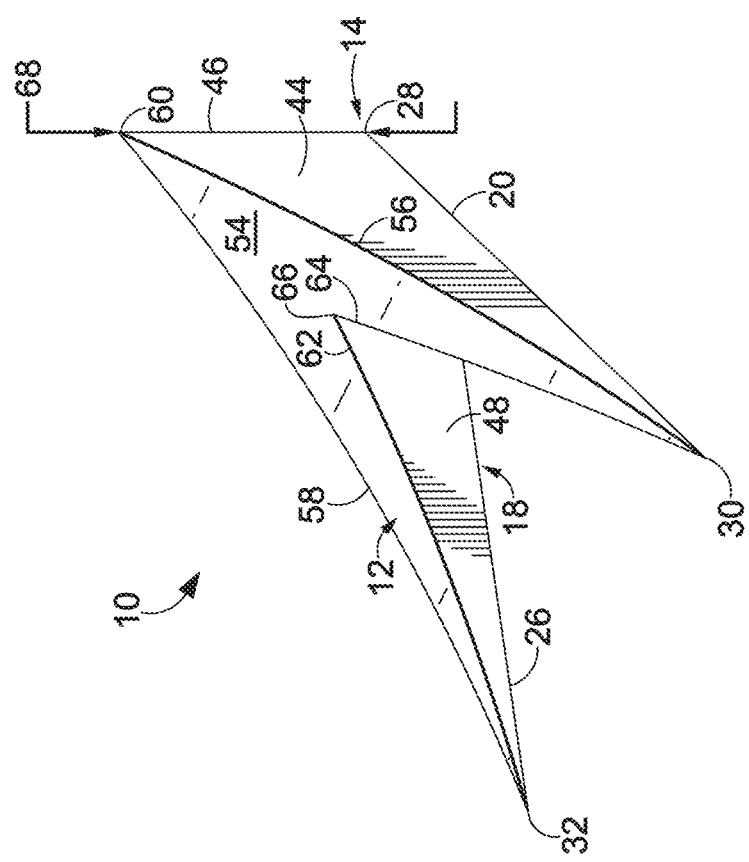
FIG. 10A depicts a vortex generator in accordance with an aspect hereof.
Figure 10D:
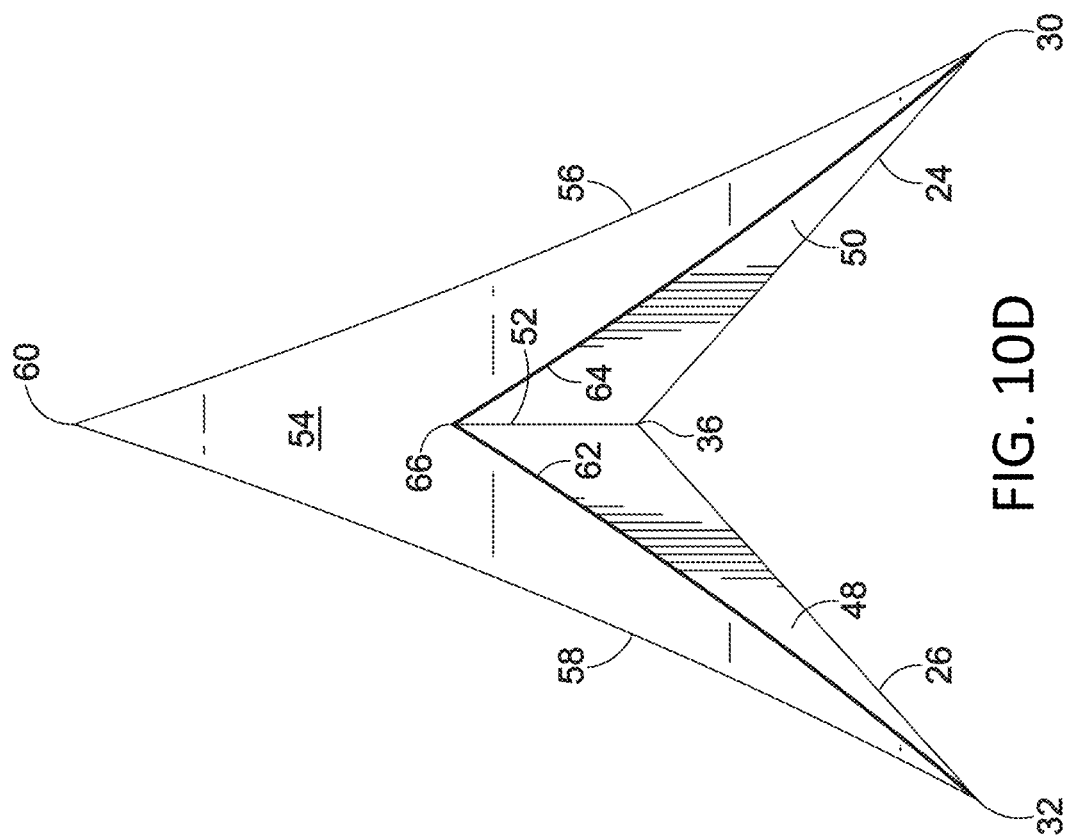
FIGS. 10C and 10D depict other views of the vortex generator depicted in FIGS. 10A and 10B in accordance with an aspect hereof.
Figure 10C:
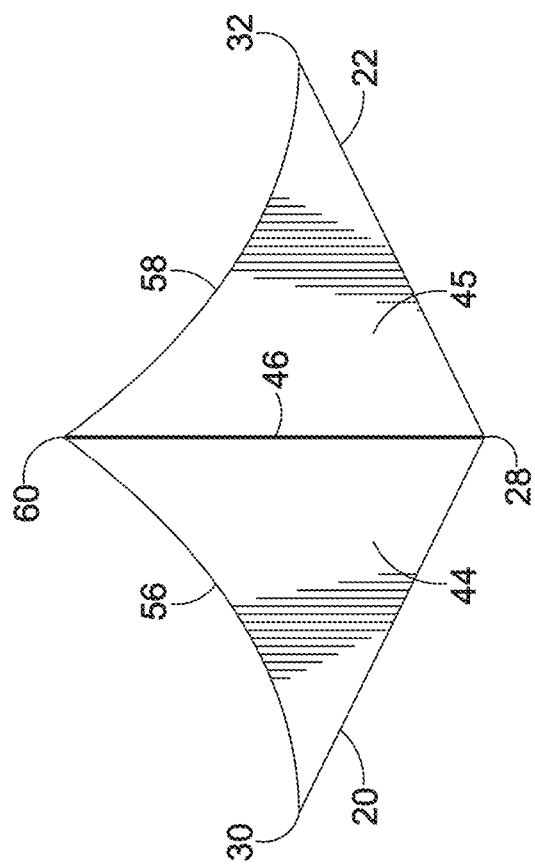
Figure 12:
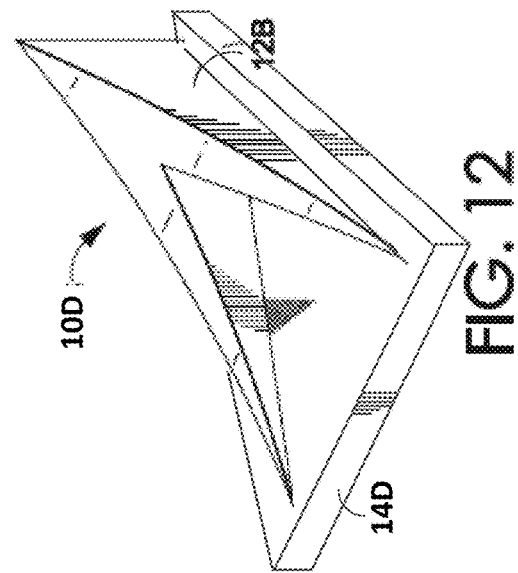
FIG. 12 depicts another vortex generator in accordance with an aspect hereof.

Referring now to FIG. 10A-10D, an exemplary vortex generator is depicted and is identified generally by reference numeral 10. FIG. 10B depicts a bottom elevation of the vortex generator shown in FIGS. 10A, 10B, and 10D. FIG. 10C depicts a rear elevation view, and FIG. 10D depicts a front elevation perspective. FIG. 10C is described as a rear view because in one aspect the vortex generator 10 is positioned so that the vertex 60 is "downstream" (relative to vertices 30 and 32) when the fluid medium flows over the vortex generator 10.

The vortex generator 10 includes a vane 12 that extends from a base 14. Generally, the base 14 is the part of the vortex generator 10 that supports the vortex generator 10 on an article (e.g., garment or equipment), adhesive strip, or human, and the vane 12 is the part of the vortex generator 10 that affects the boundary layer of the fluid-medium flow. In FIG. 10A, there is not necessarily a clear delineation between the vane 12 and the base 14, and a portion of the vortex generator 10 that is considered part of the vane 12 might also be considered part of the base 14. For example, FIG. 10B depicts a bottom elevation of the vortex generator 10, including a bottom surface 16. The bottom surface 16 might be considered part of the vane 12 because it forms part of the bottom portion of the vane, which affects the boundary layer. In addition, the bottom surface 16 might also be considered part of the base 14, if the bottom surface 16 is used to couple the vortex generator 10 to an article.

In FIGS. 10A and 10B, the vane includes a bottom portion 18, which includes a dart-polygon configuration. In this instance, the dart-polygon configuration is defined by the periphery edges 20, 22, 24, and 26 of the bottom surface 16 depicted in FIG. 10B. Some of these edges can also be seen in each of FIGS. 10A-10C.

In FIG. 10B, edges 20 and 22 intersect at vertex 28; edges 20 and 24 intersect at a vertex 30; edges 22 and 26 intersect at a vertex 32; and edges 24 and 26 intersect at a vertex 34. Generally, the dart-polygon configuration of the bottom surface 16 includes a first convex portion 36, a second convex portion 38, and a third convex 40. In this context, the term convex describes an interior angle of a polygon that is less than 180 degrees (i.e., convex interior angle). In addition, the dart-polygon configuration of the bottom surface 16 includes a concave portion 42, and in this context, concave describes an interior angle of the polygon that is greater than 180 degrees (i.e., concave interior angle). An angle of the first convex portion 36 is greater than the respective angles of the second and third convex portions 38 and 40, which are substantially similar.

The dart-polygon configuration might be defined at least in part by angles of the convex interior portion 36 and the concave interior portion 42. Referring to FIG. 10B, in one aspect, the concave portion 42 includes an angle that is in a range of about 300 degrees to about 305 degrees. And in one further aspect, the angle of concave portion 42 is about 302.16 degrees. In another aspect, the convex interior portion 36 is in a range of about 35 degrees to about 40 degrees. In an additional aspect, the convex interior portion 36 is defined by an angle of about 38.8 degrees.

In FIGS. 10A-10D, the periphery edges 20, 22, 24, and 26 also form corners or edges of the vortex generator 10 at which walls of the vortex generator meet the bottom surface 16. For example, a side wall 44 extends from the edge 20, and another side wall 45 (FIG. 10C) extends from the edge 22. For descriptive purposes, the walls 44 and 45 might be referred to as external walls or external side walls. The external side walls 44 and 45 that extend from edges 20 and 22 meet at another edge 46, which also intersects with the edges 20 and 22 at the vertex 28. In a further aspect, a wall 48 extends from the edge 26, and another wall 50 extends from the edge 24 and meets the wall 48 at an edge 52. For descriptive purposes the walls 48 and 50 might be referred to as internal walls or internal side walls. The edge 52 intersects with the edges 24 and 26 at the vertex 36. These internals side walls 48 and 50 and edges 24 and 26 form a concave portion of the vortex generator.

The vortex generator 10 might be defined by various dimensions, such as a height, length, width, and the like. These dimensions might be defined independently, or might be defined as ratios of one another. For example the vortex generator 10 might include a height 68, which is defined at least in part by a length of the edge 46 extending between the vertices 28 and 60. In a further example, the vortex generator 10 includes a length 70 defined at least in part by a distance between the vertex 28 and a reference line 72 connecting the vertices 30 and 32. In addition, a width might be defined as a distance between the vertex 30 and the vertex 32. In one aspect, the vortex generator includes a height to length ratio in a range of about 2:5 to about 2.5:5. And in a further aspect, the vane includes a length to width ratio in a range of about 5:3.5 to about 5.3:3.7.

The vortex generator 10 also includes a top surface 54 that is generally concave and that is depicted in FIGS. 10A and 10D. The top surface 54 is generally defined by a first curved edge 56 and a second curved edge 58, each of which forms a top edge of a respective external side wall 44 and 45. The curved edge 56 intersects with edge 20 at vertex 30, and the curved edge 58 intersects with edge 22 at vertex 32. In addition, both of the edges 56 and 58 intersect with one another and with edge 46 at a vertex 60. The top surface 54 is also generally defined by a third curved edge 62 and a second curved edge 64, each of which forms a top edge of a respective internal side wall 48 and 50. The curved edge 62 intersects with edges 58, 22, and 26 and at vertex 32, and the curved edge 64 intersects with edges 56, 20, and 24 at vertex 30. In addition, both of the edges 62 and 64 intersect with one another and with edge 52 at a vertex 66.

The top surface 54 might include various dimensions that define at least part of the vortex generator 10. For example, in one aspect, the top surface is generally concave and a curve of the top surface includes a simple curve having a substantially constant radius. In an alternative aspect, the curve of the top surface is a compound curve and includes curves having different radii. For example, a first curve having a first arc radius might extend from the vertices 30 and 32 to a mid-point of the top surface aligned with vertex 66, and a second curve having a second arc radius might extend form the mid-point to the vertex 60. In one aspect, the first arc radius is in a range of about 10.00 mm to about 11.27 mm and the second arc radius is in a range of about 6.9 mm to about 8.3 mm.

The vortex generator depicted in FIGS. 10A-10D is illustrated to include relatively sharp features. For example, the edges 20, 26, 56, and 58 (FIG. 10A) are depicted as corners with minimal rounding, and the vertices 30, 32, and 60 are depicted as coming to a relatively sharp point. But in other aspects, each of these elements might be rounded or chamfered without departing from the scope of the claimed subject matter.

Figure 11:
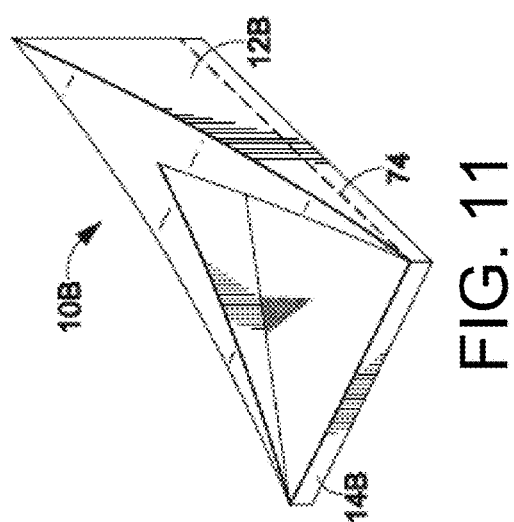
FIG. 11 depicts another vortex generator in accordance with an aspect hereof.

Referring now to FIG. 11, another aspect of a vortex generator 10B is depicted in which the vane 12 depicted in FIGS. 10A-10D is coupled on top of a base plate 14B. That is, base plate 14B is a layer of material that is sized to substantially cover the bottom surface 16 depicted in FIG. 10B. In FIG. 11, the vane is identified by reference numeral 12B. The base plate 14B is illustrated to include a triangular shape, which substantially aligns with the vertices 30, 32, and 28. But in other aspects, the base plate 14B might be circular, ovular, rectangular, or some other shape. In addition, the base plate 14B might include a thickness that falls in a range of thicknesses between about 0.25 mm and 0.5 mm. Furthermore, the base plate might extend beyond the footprint of the vane, as depicted by a vortex generator 10D in FIG. 12, which includes a base 14D that extends beyond the footprint of the vane 12B.

In one aspect, the vane 12B and the base plate 14B are integrally formed as a single part. For instance, the vane 12B and the base plate 14B might be co-molded, sequentially molded, or cast together as a single part. In FIG. 11, reference line 74 is depicted to illustrate an approximate interface between the vane 12B (i.e., the bottom portion 18 of the vane 12) and the base plate 14B. In one aspect, the vortex generator is defined in part by a cross-sectional plane at the interface. For instance, at the cross-sectional plane at the interface between the vane 12B and the base plate 14B, a cross-sectional view of the vane 12B includes the dart-polygon configuration depicted in FIG. 10B.

The base plate 14B serves various functions. For instance, in one aspect the base plate 14B provides structural rigidity to the bottom portion 18 of the vane 12B by coupling one vertex 30 to another vertex 32. In this respect, the base plate 14B helps to bridge a gap between these vertices in the concave portion of the vane 12B. In addition, the base plate 14B helps to provide an increased surface area for coupling the vortex generator 10B to an article.

Figure 14:
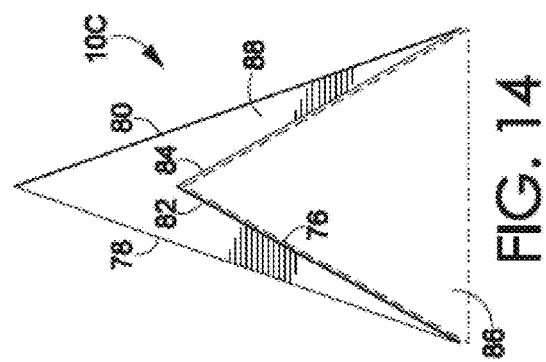
FIG. 14 depicts a bottom elevation of the vortex generator depicted in FIG. 13 in accordance with an aspect hereof.
Figure 13:
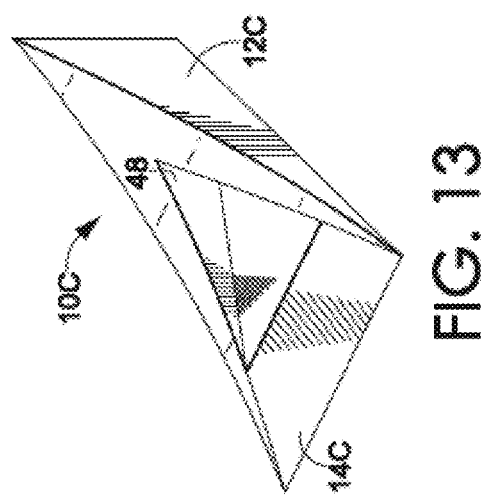
FIG. 13 depicts another vortex generator in accordance with an aspect hereof.

Referring now to FIGS. 13 and 14, another aspect of a vortex generator 10C is illustrated in which a base plate 14C is arranged within the concave portion of the vane 12C. That is, the base plate 14C extends between the internal walls 48 and 50 and bridges the space therebetween. In one aspect, the vane 12C and the base plate 14C are integrally formed as a single part, such as by co-molding or casting together. For example, FIG. 14 illustrates a bottom elevation of the vortex generator 10C.

Although the vane 12C and the base 14C might be integrated as a single part, FIG. 14 includes a reference line 76, which indicates an approximate outline of the base plate 14C. That is, lines 78, 80, 82, and 84 are substantially similar to the edges 20, 22, 24, and 26, and the reference line marks an approximate interface between the vane 12C and the base plate 14C. In an aspect in which the vane 12C and the base plate 14C are integrally formed as a single part, there might not be a clear delineation between the two portions, and the reference line 76 is provided for explanatory purposes. As described above, a base-plate portion 86 bridges a gap between the edges 82 and 84, and corresponding walls. Thus, the base plate 14C helps to provide some structural rigidity and increases the surface area usable to attach the vortex generator 10C to an article.

In FIG. 14, the reference line 76 illustrates an approximate division between the base-plate portion 86 and the bottom portion 88 of the vane 12C. As illustrated, the bottom portion 88 includes a dart-polygon configuration that is substantially similar to the dart-polygon configuration depicted in FIG. 10B.

The vortex generators 10B and 10C depicted in FIGS. 11-14 are illustrated to include relatively sharp and non-rounded features. But in other aspects, edges, corners, and vertices, might be rounded without departing from the scope of the claimed subject matter.

Figure 15:
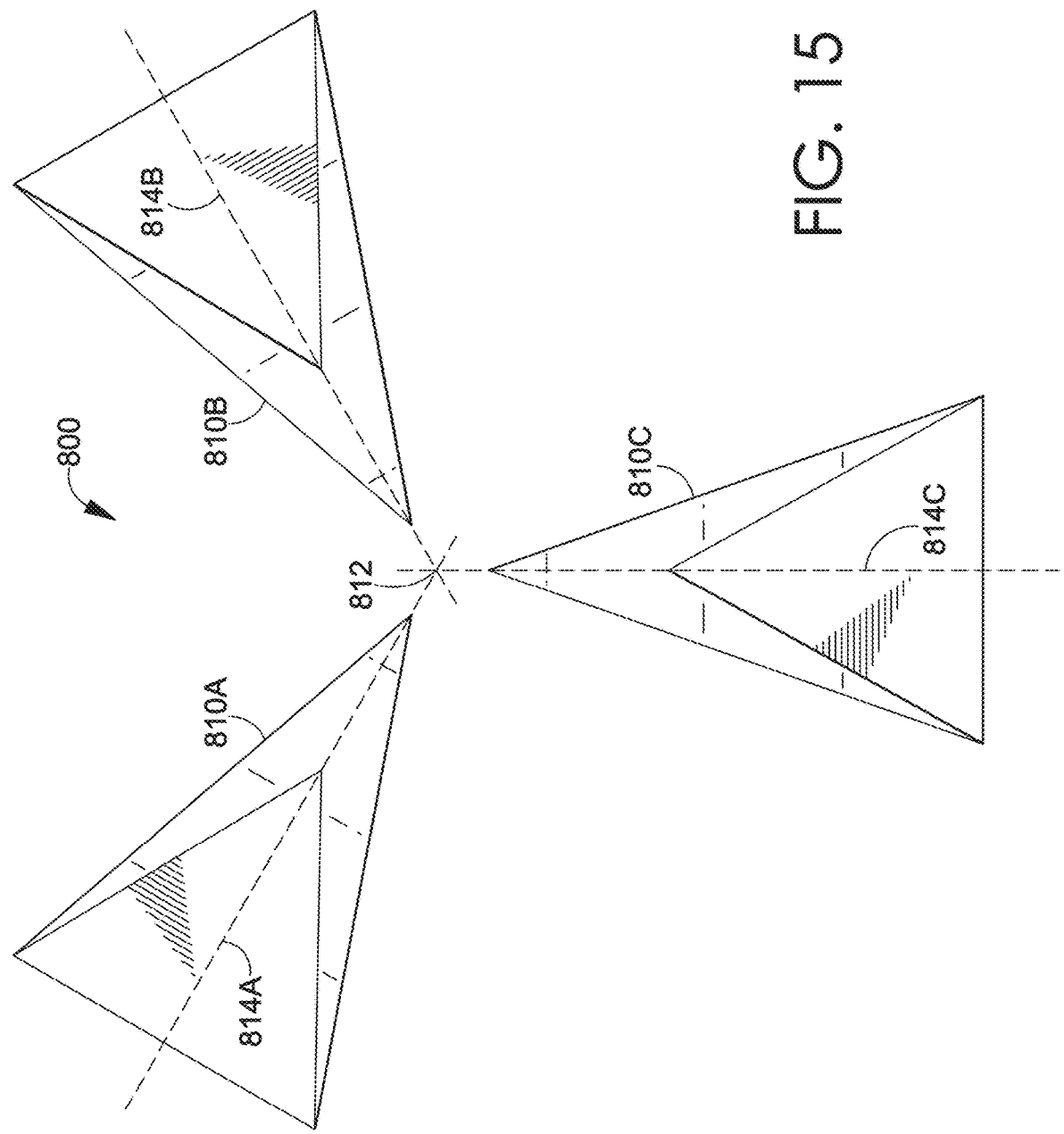
FIG. 15 depicts an arrangement of vortex generators in accordance with an aspect hereof.
Figure 16:
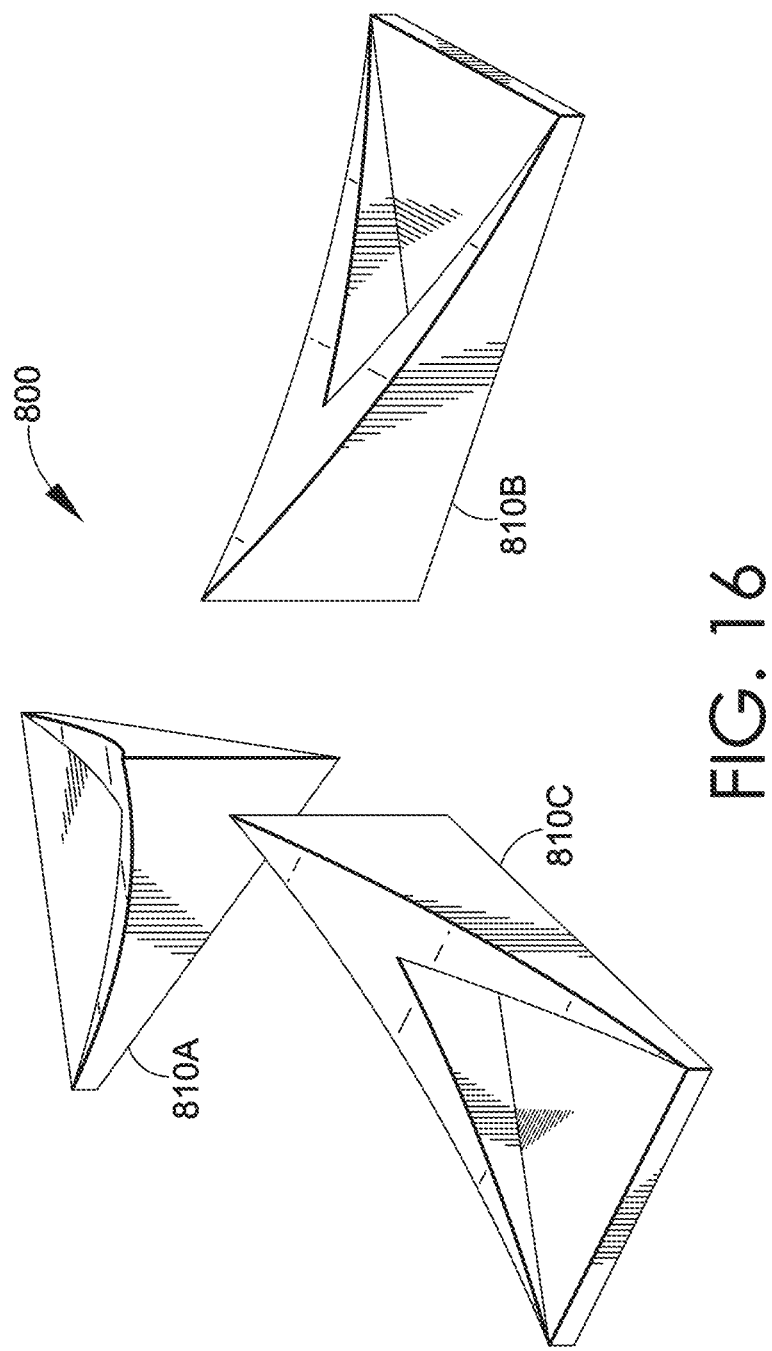
FIG. 16 depicts a perspective view of the arrangement depicted in FIG. 15 in accordance with an aspect hereof.

Referring now to FIGS. 15 and 16, an arrangement 800 of vortex generators 810A, 810B, and 810C is shown (e.g., star-shaped arrangement). In FIG. 15, the arrangement 800 includes a center point 812 and the vortex generators 810A, 810B, and 810C are radially positioned around the center point 812. That is, each vortex generator includes a respective midline plane 814A, 814B, and 814C, and the midline planes intersect at the center point of the arrangement 800. As such, the vortex generators 810A, 810B, and 810C are arranged in a ring around the center point 812.

The arrangement 800 of vortex generators 810A, 810B, and 810C might be configured to include a spacing scheme. For example, each vertex of the vortex generators 810A, 810B, and 810C might be spaced a distance from the center point 812. In one aspect, the distance between the center point 812 and each vertex is in a range of about 0.5 mm to about 1.5 mm. In addition, the spacing scheme might include a substantially even radial spacing between adjacent vortex generators. For example, in FIG. 15, the midline of each adjacent vortex generators might be spaced about 120 degrees apart, since there are three vortex generators. In FIG. 15, the arrangement 800 includes three separate vortex generators. In other aspects, the arrangement of vortex generators might include two vortex generators or might include more than three vortex generators. As such, the radial spacing of adjacent vortex generators might be substantially equal to 360 degrees divided by the number of vortex generators in the arrangement.

The vortex generators 810A, 810B, and 810C are depicted as independent vortex generators having respective bases and base plates, and the arrangement 800 might be created using a template (e.g., step 714 of method 700). However, in other aspects the vortex generators 810A, 810B, and 810C might be constructed as a single, integrated unit, such that each base or base plate is connected to one another.

In one aspect, arranging two or more vortex generators radially around a midpoint (as illustrated in FIG. 15) helps to reduce drag of an underlying article from multiple directions. For example, when a person is running, throwing, etc., his or her arms and legs might be moving in more than one direction. That is, both arms are often pumped forward and rearward in an alternating fashion. In addition, each leg experiences a forward motion when the leg is extended and a rearward motion when the foot is pulled up from the ground. By arranging multiple vortex generators at different orientations on an article (e.g., arm sleeve, leg sleeve, pant leg, adhesive tape, etc.), which is worn by the person running, one vortex generator can help to reduce drag when the arm and/or leg is moved in a first direction, whereas another vortex generator can help reduce drag when the arm and/or leg is moved in a different direction.

Figure 17:
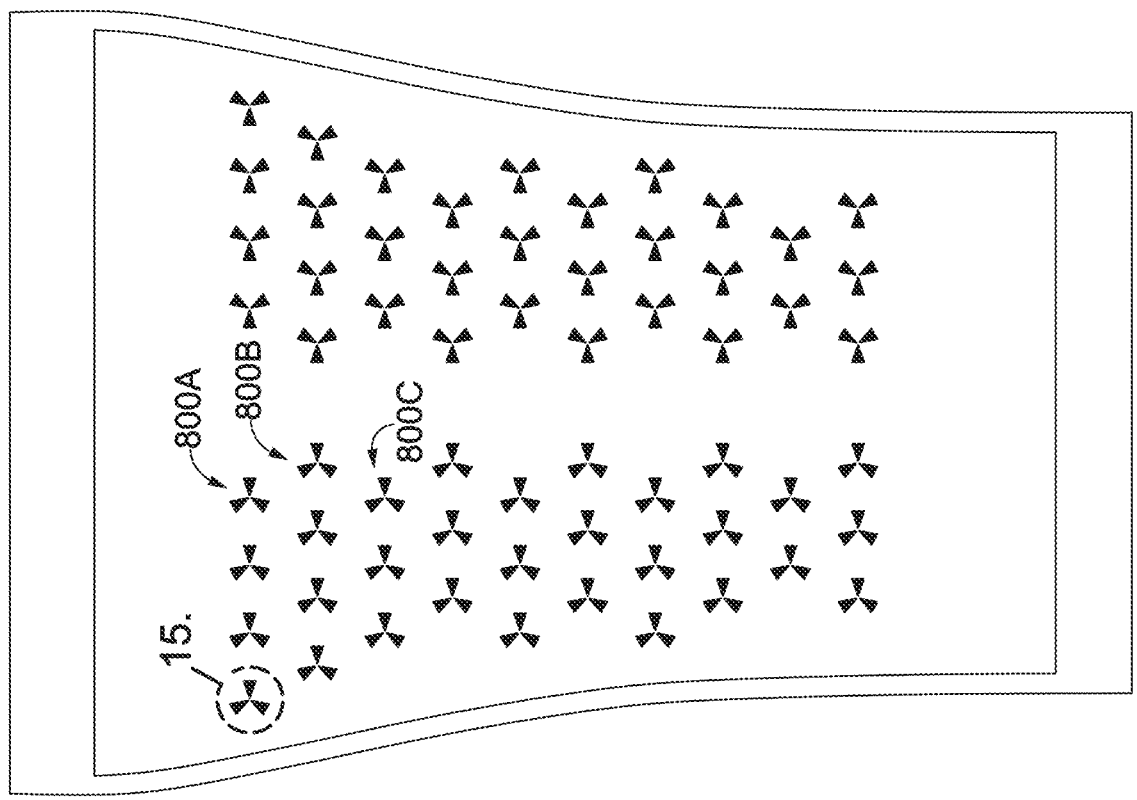
FIG. 17 depicts an exemplary arrangement of multiple sets of vortex generators in accordance with an aspect hereof.

In a further aspect, multiple sets of radially arranged vortex generators are applied to a surface in a pattern. For example, FIG. 17 shows an exemplary arrangement of multiple sets 800A, 800B, and 800C of vortex generators. In an exemplary aspect, the sets 800A, 800B, and 800C include an arrangement similar to that depicted in FIG. 15. The sets 800A, 800B, and 800C might be spaced and aligned using various strategies to minimize drag. For example, the respective center points (e.g., 812) might be aligned vertically, horizontally, or diagonally on the surface, and might be spaced apart by a prescribed distance. The illustrative pattern depicted in FIG. 17 might be applied to the anterior surface of various types of articles, and in one aspect, is applied to the outer surface of the anterior side of a calf sleeve.

Figure 18A:
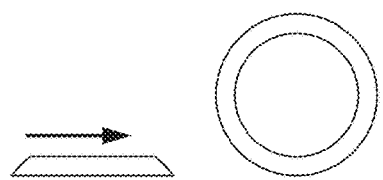
FIGS. 18A-18N each depicts a respective vortex-generator configuration in accordance with an aspect hereof.
Figure 18B:
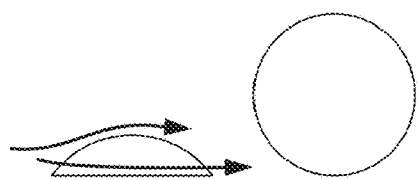
Figure 18C:
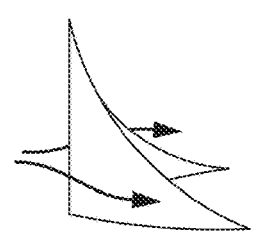
Figure 18D:
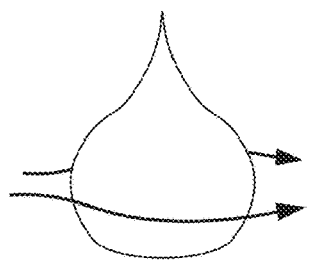
Figure 18E:
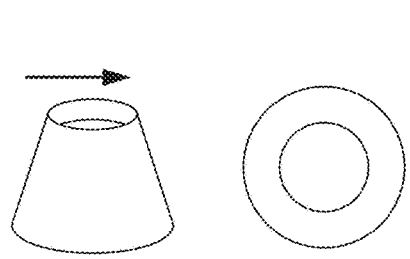
Figure 18F:
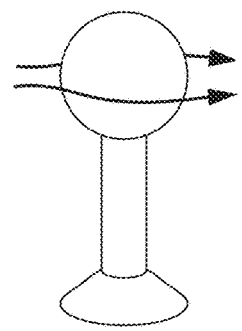
Figure 18G:
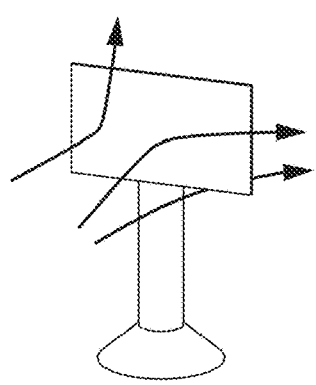
Figure 18H:
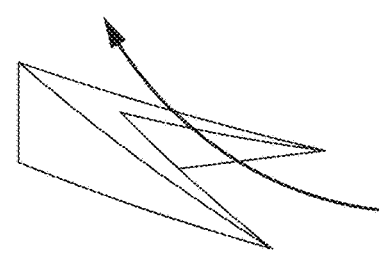
Figure 18I:
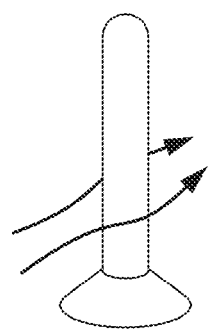
Figure 18J:
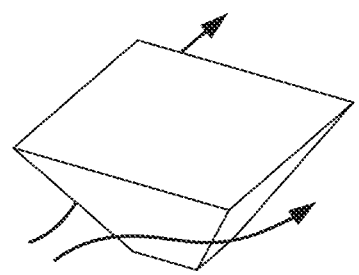
Figure 18K:
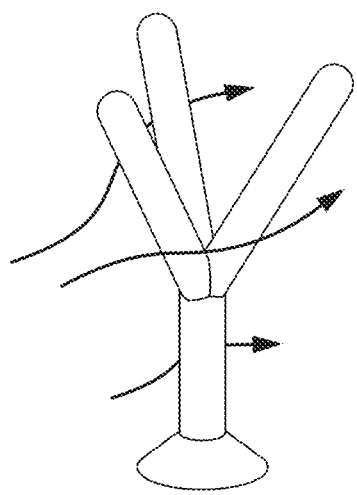
Figure 18L:
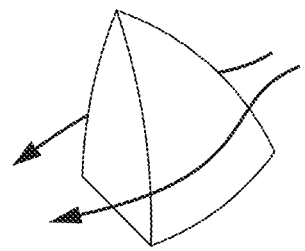
Figure 18M:
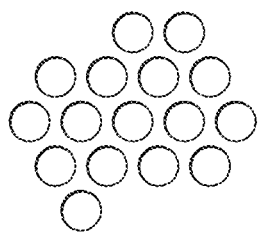
Figure 18N:
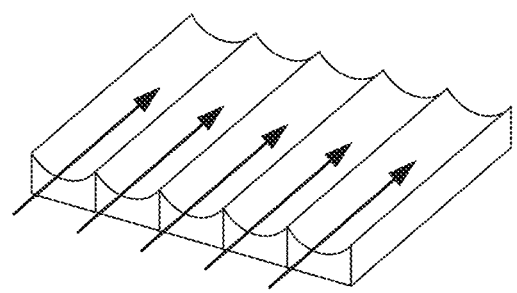

FIGS. 9-17 depict vortex generators having a dart-shaped configuration, which is utilized in some aspects of the present invention. However, vortex generators having various other configurations might be used in other aspects of the invention, such as those configurations depicted in FIGS. 18A-18N. For instance, FIG. 18A depicts a ring-like donut configuration for a vortex generator. FIG. 18B depicts bump-style configuration that is part of a hemisphere. FIG. 18C depicts a multi-sail arrangement, and FIG. 18D depicts a teardrop-shaped configuration for a vortex generator. FIG. 18E depicts a frustoconical configuration. FIG. 18F depicts a spherical configuration. FIG. 18G depicts a possible paddle configuration. FIG. 18H depicts another style of dart configuration having a non-curved upper surface. FIG. 18I includes a spike or peg configuration. FIG. 18J depicts a upside down pyramid. FIG. 18K depicts a multi-peg configuration. FIG. 18L depicts a fin-shaped configuration. FIG. 18M illustrates a dimple configuration. And FIG. 18N shows a ribbed configuration. One or more of these vortex-generator configurations might be used in one or more aspects of the present invention.

Various aspects of the present invention are described in FIGS. 1-18N. One or more of these aspects are usable independently, or are combinable to provide, a system for reducing drag on an object. In one aspect, the system includes a first vortex-generator arrangement (e.g., using one or more of the patterns 120, 122, 124, 126) coupled to a first article (e.g., garment, tape, equipment, etc.), the first vortex-generator arrangement comprising a first set of vortex generators having a first substantially consistent spacing and a first substantially consistent vortex-generator height. In addition, the system includes a second vortex-generator arrangement coupled to a second article, the second vortex-generator arrangement comprising a second set of vortex generators having a second substantially consistent spacing and a second substantially consistent vortex-generator height. In a further aspect, the second substantially consistent spacing is different than the first substantially consistent spacing and/or the second vortex-generator height is different than the first vortex-generator height.

In another aspect, one or more of the aspects depicted in FIGS. 1-18N are usable to provide a vortex-generator kit including a first article (e.g. garment, tape, or equipment) having a first vortex-generator arrangement and a second article having a second vortex-generator arrangement. The first and second articles are configured to equip one or more human anatomical zones with vortex generators. The first vortex-generator arrangement includes a first set of vortex generators having a first substantially consistent spacing and a first substantially consistent vortex-generator height, and the second vortex-generator arrangement includes a second set of vortex generators having a second substantially consistent spacing and a second substantially consistent vortex-generator height. The first and second substantially consistent spacing and the first and second substantially consistent vortex-generator height are based on a vortex-generator mapping (e.g., one of the mappings 100, 200, 300, or 400).

From the foregoing, it will be seen that this invention is one well adapted to attain all the ends and objects hereinabove set forth together with other advantages, which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A vortex-generator applique comprising:
a strip of material comprising a flexible and elastomeric tape body having a first side and a second side;
a first adhesive layer having a first side and a second side, wherein the second side of the first adhesive layer is coupled to the first side of the strip of material;
a second adhesive layer having a first side and a second side, wherein the first side of the second adhesive layer is coupled to the second side of the strip of material;
one or more vortex generators coupled to the first adhesive layer; and
wherein the one or more vortex generators each includes a base coupled to the first side of the first adhesive layer.

2. The vortex-generator applique of claim 1 further comprising, a removable backing removably coupled to the second surface of the second adhesive.

3. The vortex-generator applique of claim 2, wherein the removable backing includes a first surface that is removably coupled to the second adhesive layer and a second surface that faces away from the first surface, the second surface of the removable backing including a set of instructions explaining how to apply the vortex-generator applique to an object.

4. The vortex-generator applique of claim 3, wherein the set of instructions explain where to apply the vortex-generator applique to a portion of a human anatomy.

5. The vortex-generator applique of claim 3, wherein the set of instructions explain how to apply to vortex-generator applique to a piece of athletic equipment.

6. The vortex-generator applique of claim 1, wherein the one or more vortex generators include a plurality of vortex generators, and wherein a first vortex generator and a second vortex generator are arranged in a grid-like pattern of vortex generators.

7. The vortex-generator applique of claim 1, wherein the one or more vortex generators each includes a vane including a bottom portion that has a dart-polygon configuration and that is integrally formed with the base, the vane including a top surface that is generally concave.

8. A kit for affecting drag properties of an object, the kit comprising:
a first vortex-generator applique including:
a first strip of material having a first vortex-generator side and a first adhesive side;
a first adhesive layer applied to the first adhesive side of the first strip of material; and
a first plurality of discrete base structures coupled to the first adhesive side of the first strip of material;
a first plurality of vortex generators, wherein each vortex generator of the first plurality of vortex generators is coupled to a discrete base structure of the first plurality of discrete base structures, the first plurality of vortex generators including a first vortex-generator density within a first surface area; and
a second vortex-generator applique including:
a second strip of material having a second vortex-generator side and a second adhesive side;
a second adhesive layer applied to the second adhesive side of the second strip of material;
a second plurality of discrete base structures coupled to the second adhesive side of the second strip of material;
a second plurality of vortex generators, wherein each vortex generator of the second plurality of vortex generators is coupled to a discrete base structure of the second plurality of discrete base structures, the second plurality of vortex generators including a second vortex-generator density within a second surface area, wherein the second surface area is a same size as the first surface area and wherein the first vortex-generator density is different than the second vortex-generator density.

9. The kit of claim 8, wherein the second plurality of vortex generators includes at least four vanes that form a star-shaped pattern.

10. The kit of claim 8 further comprising, a set of instructions for applying the first vortex-generator applique and the second vortex-generator applique to a human, wherein the set of instructions indicates that the first vortex-generator applique is designed to be applied to a first body part and that the second vortex-generator applique is designed to be applied to a second body part.

11. The kit of claim 8 further comprising, a set of instructions for applying the first vortex-generator applique and the second vortex-generator applique to one or more pieces of athletic equipment.

* * * * *